(12) United States Patent
Kato

(10) Patent No.: US 10,831,435 B2
(45) Date of Patent: *Nov. 10, 2020

(54) SHARED TERMINAL, COMMUNICATION SYSTEM, IMAGE TRANSMISSION METHOD, AND RECORDING MEDIUM

(71) Applicant: RICOH COMPANY, LTD., Tokyo (JP)

(72) Inventor: Yoshinaga Kato, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/244,622

(22) Filed: Jan. 10, 2019

(65) Prior Publication Data

US 2019/0146745 A1 May 16, 2019

Related U.S. Application Data

(63) Continuation of application No. PCT/JP2017/025805, filed on Jul. 14, 2017.

(30) Foreign Application Priority Data

Jul. 20, 2016 (JP) ................................. 2016-142078

(51) Int. Cl.
*G06F 15/16* (2006.01)
*G06F 3/14* (2006.01)
(Continued)

(52) U.S. Cl.
CPC ........... *G06F 3/1454* (2013.01); *G06Q 10/10* (2013.01); *H04N 1/00116* (2013.01); *H04W 4/08* (2013.01); *H04W 4/80* (2018.02)

(58) Field of Classification Search
CPC ......... G06F 3/1454; H04W 4/80; H04W 4/08; G06Q 10/10; H04N 1/00116
(Continued)

(56) References Cited

U.S. PATENT DOCUMENTS 10,452,338 B2 * 10/2019 Kato .................... G06Q 10/10
2005/0280636 A1 12/2005 Hildebrandt et al.
(Continued)

FOREIGN PATENT DOCUMENTS

JP 2001-292266 10/2001
JP 2009-033253 2/2009
(Continued)

OTHER PUBLICATIONS

International Search Report dated Sep. 5, 2017 in PCT/JP2017/025805 filed Jul. 14, 2017.
(Continued)

*Primary Examiner* — Alan S Chou
(74) *Attorney, Agent, or Firm* — Xsensus LLP

(57) ABSTRACT

A shared terminal includes: circuitry to cause a display to display an image to a plurality of users, the plurality of users simultaneously sharing use of the shared terminal; and a network interface to communicate with a destination management server through a network, the destination management server being different from the shared terminal and storing, in a memory, for each of the plurality of users, user identification information of the user in association with an email address of the user. The circuitry: obtains, from a first terminal of a first user of the plurality of users, first terminal identification information identifying the first terminal; transmits first user identification information of the user of the first terminal to the destination management server; receives, from the destination management server, a first email address of the first user, the first email address being obtained from the memory of the destination management server using the first user identification information; and transmits an email addressed to the received first email address to allow the first user to obtain data relating to the image displayed to the plurality of users.

20 Claims, 28 Drawing Sheets

(51) Int. Cl.
*G06Q 10/10* (2012.01)
*H04W 4/80* (2018.01)
*H04N 1/00* (2006.01)
*H04W 4/08* (2009.01)

(58) Field of Classification Search
USPC ........................................................ 709/206
See application file for complete search history.

(56) References Cited

U.S. PATENT DOCUMENTS

| | | | | |
|---|---|---|---|---|
| 2012/0023180 | A1* | 1/2012 | Fukuoka | G06Q 10/10 709/206 |
| 2013/0097072 | A1* | 4/2013 | Hayashi | G06F 16/116 705/39 |
| 2013/0290416 | A1 | 10/2013 | Nelson et al. | |
| 2014/0162239 | A1 | 6/2014 | Roach | |
| 2015/0149929 | A1 | 5/2015 | Shepherd et al. | |
| 2016/0234470 | A1 | 8/2016 | Honda et al. | |
| 2018/0046426 | A1* | 2/2018 | Kato | G06F 3/1454 |
| 2018/0288186 | A1* | 10/2018 | Kato | H04L 12/1813 |
| 2019/0377537 | A1* | 12/2019 | Kato | G06Q 10/107 |

FOREIGN PATENT DOCUMENTS

| | | |
|---|---|---|
| JP | 2014-106843 | 6/2014 |
| WO | WO2014/042278 A1 | 3/2014 |
| WO | WO2015/143900 A1 | 10/2015 |

OTHER PUBLICATIONS

Supplementary International Search Report dated Aug. 20, 2018 in PCT/JP2017/025805 filed Jul. 14, 2017.
International Preliminary Report on Patentability in PCT/JP2017/025805 filed Jul. 14, 2017.
Written Opinion of the International Searching Authority in PCT/JP2017/025805 filed Jul. 14, 2017.

\* cited by examiner

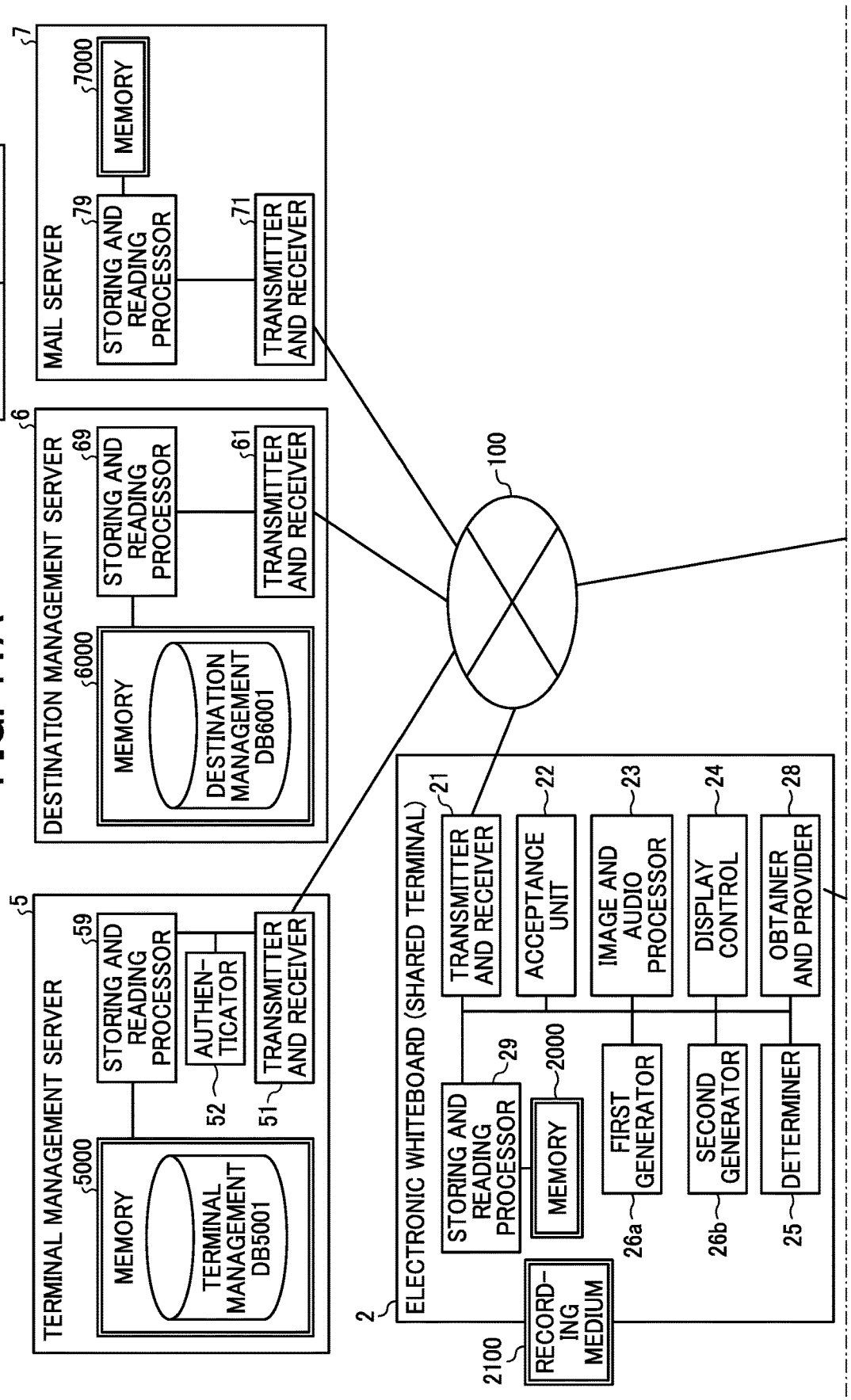

FIG. 12A

| TERMINAL ID | USER ID |
|---|---|
| aaa | 10001 |
| bbb | 10002 |
| . . . | . . . |

FIG. 12B

| USER ID | EMAIL ADDRESS |
|---------|---------------|
| 10001 | aaa@xxx.co.jp |
| 10002 | bbb@xxx.co.jp |
| . . . | . . . |

SHARED TERMINAL, COMMUNICATION SYSTEM, IMAGE TRANSMISSION METHOD, AND RECORDING MEDIUM

CROSS-REFERENCE TO RELATED APPLICATIONS

This patent application is a continuation of PCT Application No. PCT/JP2017/025805, filed Jul. 14, 2017, which is based on and claims priority pursuant to 35 U.S.C. § 119(a) to Japanese Patent Application No. 2016-142078, filed on Jul. 20, 2016, in the Japan Patent Office, the entire disclosure of which is hereby incorporated by reference herein.

BACKGROUND

Technical Field

The present invention relates to a shared terminal, communication system, image transmission method, and recording medium.

Description of the Related Art

Recently, electronic whiteboards are disposed in various types of places such as meeting rooms in companies or classrooms in educational institutions. The electronic whiteboard is provided with a touch panel display of large size, on which each user draws an image with an electronic pen or his or her finger. The image drawn by each user is displayed to a plurality of users in the same room. Through sharing the image between the users, a meeting or a lecture can be conducted more smoothly.

After the meeting or class finishes, the image being displayed on the electronic whiteboard, such as data of the drawing image drawn on the electronic whiteboard, may be transmitted to a personal computer (PC) owned by any user who is participating in the meeting or class, as an attachment file to an email. This simplifies a process of distributing the material used during the meeting or class.

However, to transmit data such as the drawing image data as an email attachment file from the electronic whiteboard, the electronic whiteboard requests the user to manually enter his or her email address with an electronic pen. Accordingly, transmission of an email attached with such as the drawing image data has been cumbersome for the user as it requires manual operation to be performed by the user.

SUMMARY

In one or more embodiments, a shared terminal includes: circuitry to cause a display to display an image to a plurality of users, the plurality of users simultaneously sharing use of the shared terminal; and a network interface to communicate with a destination management server through a network, the destination management server being different from the shared terminal and storing, in a memory, for each of the plurality of users, user identification information of the user in association with an email address of the user. The circuitry further obtains: from a first terminal of a first user of the plurality of users, first terminal identification information identifying the first terminal; transmits first user identification information of the user of the first terminal to the destination management server; receives, from the destination management server, a first email address of the first user, the first email address being obtained from the memory of the destination management server using the first user identification information; and transmits an email addressed to the received first email address to allow the first user to obtain data relating to the image displayed to the plurality of users In one example, a communication system is provided, which includes the shared terminal, the terminal management server, and the destination management server.

In one example, a method of controlling transmission of an image is provided, which includes: displaying, on a display, an image to a plurality of users, the plurality of users simultaneously sharing use of the shared terminal; communicating with a destination management server, the destination management server storing, in a memory, for each one of the plurality of users, user identification information of the user in association with an email address of the user; obtaining, from a first terminal of a first user of the plurality of users, first terminal identification information identifying the first terminal; transmitting the received first user identification information to the destination management server; receiving a first email address of the first user from the destination management server, the first email address being obtained from the memory of the destination management server using the first user identification information; and transmitting an email addressed to the first email address to allow the first user to obtain data relating to the image displayed to the plurality of users.

In one example, a non-transitory recording medium is provided, which stores a control program for causing one or more processors to perform the above-described method.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings.

FIGS. 11A and 11B (FIG. 11) are a schematic diagram illustrating a functional configuration of the communication system, according to an embodiment.

FIG. 12A is a conceptual diagram illustrating a terminal management table, according to an embodiment; FIG. 12B is a conceptual diagram illustrating a destination management table, according to an embodiment.

Figure 1:
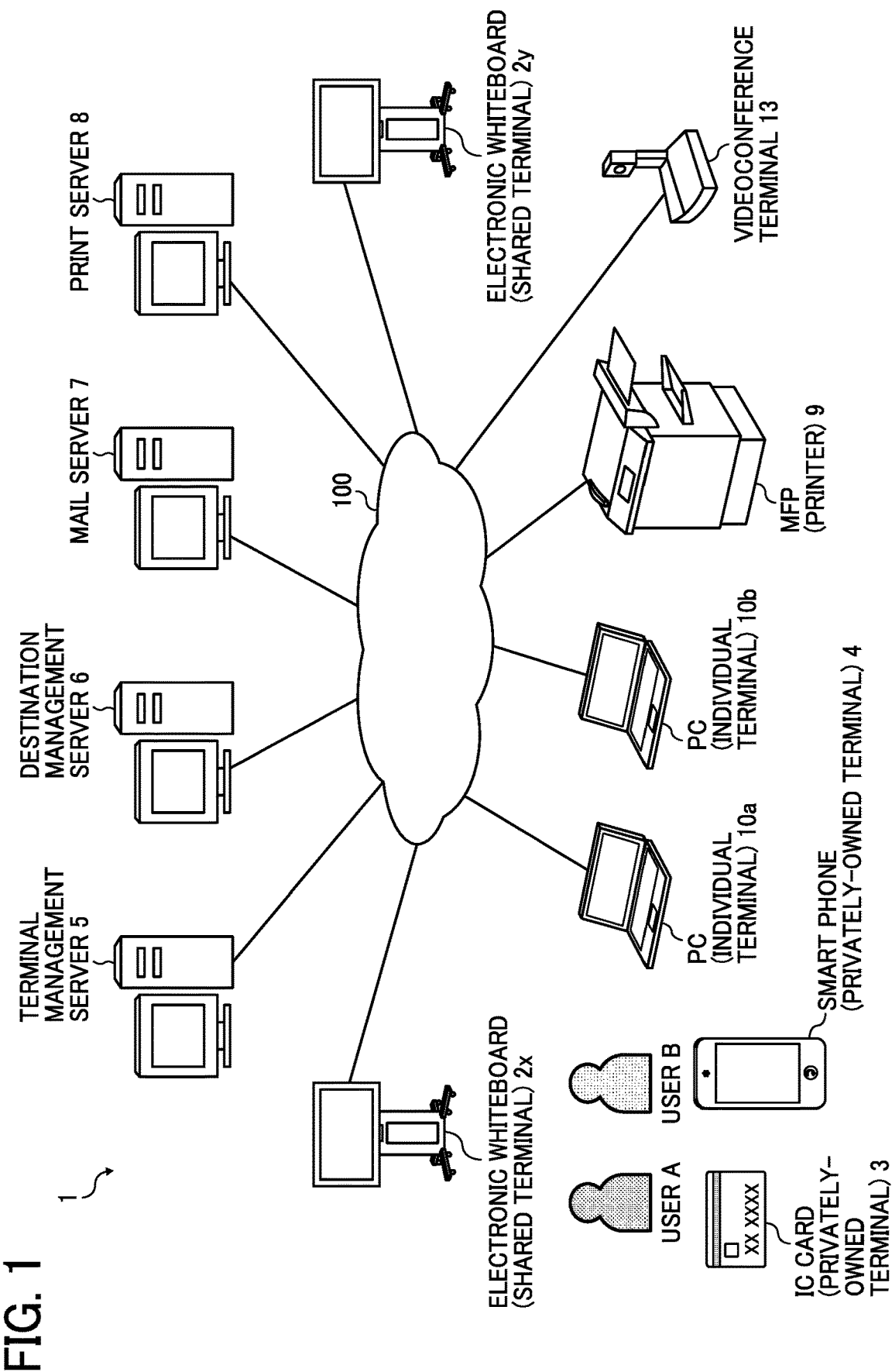
FIG. 1 is a schematic diagram illustrating a communication system according to an embodiment of the present invention.

The accompanying drawings are intended to depict embodiments of the present invention and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

The terminology used herein is for the purpose of describing particular embodiments only and is not intended to be limiting of the present invention. As used herein, the singular forms "a", "an" and "the" are intended to include the plural forms as well, unless the context clearly indicates otherwise.

Referring to the drawings, a communication system 1 is described in detail according to embodiments.

Overview of System Configuration

First, an overview of a configuration of the communication system 1 is described according to an embodiment. FIG. 1 is a schematic diagram illustrating a configuration of the communication system 1 according to the embodiment.

As illustrated in FIG. 1, the communication system 1 of the embodiment includes an electronic whiteboard 2x, an electronic whiteboard 2y, an IC card 3, a smart phone 4, a terminal management server 5, a destination management server 6, a mail server 7, a print server 8, an MFP 9, PCs 10a and 10b, and a videoconference terminal 13. For simplicity, in the following, any arbitrary one of the electronic whiteboards 2x and 2y is referred to as the "electronic whiteboard 2". Any arbitrary one of the PCs 10a and 10b is referred to as the "PC 10".

The electronic whiteboard 2, the terminal management server 5, the destination management server 6, the mail server 7, the print server 8, the MFP 9, the PC 10, and the videoconference terminal 13 are communicable with one another through a communication network 100. The communication network 100 is implemented by the Internet, mobile communication network, local area network (LAN), etc. The communication network 100 may include, in addition to a wired network, a wireless network in compliance with such as 3rd Generation (3G), Worldwide Interoperability for Microwave Access (WiMAX), Long Term Evolution (LTE), etc. The electronic whiteboard 2, IC card 3, and smart phone 4 are communicable with one another using a near-distance communication technology in compliance with such as Near Field Communication (NFC) (Registered Trademark). The smart phone 4 may communicate with the electronic whiteboard 2 using the near-distance communication technology in compliance with such as Bluetooth (Registered Trademark).

One of the electronic whiteboard 2a and the electronic whiteboard 2b transmits or receives drawing image data representing a content drawn by a user ("drawing image data"), to or from the other one of the electronic whiteboard 2a and the electronic whiteboard 2b. That is, the content drawn at the electronic whiteboard 2a is displayed at the electronic whiteboard 2b, and the content drawn at the electronic whiteboard 2b is displayed at the electronic whiteboard 2a.

The electronic whiteboard 2 generates image data in Refined Printing Command Stream (PRCS) based on the drawing image data, and transmits the generated image data to the MFP 9 through the communication network 100. The MFP 9 prints a drawing image based on the image data received from the electronic whiteboard 2. In another example, the electronic whiteboard 2 generates image data in Portable Document Format (PDF) based on the drawing image data, and transmits an electronic mail attached with the generated image data to the PC 10 through the communication network 100. The PC 10 displays a drawing image based on the image data extracted from the electronic mail.

The electronic whiteboard 2 may display an image other than the drawing image drawn by the user ("non-drawing image"), such as an image of a presentation material. The electronic whiteboard 2 generates image data in PRCS based on non-drawing image data, and transmits the generated image data to the MFP 9 through the communication network 100. In another example, the electronic whiteboard 2 generates image data in PDF based on the non-drawing image data, and transmits an electronic mail attached with the generated image data to the PC 10 through the communication network 100.

In this disclosure, the image data in PRCS and the image data in PDF each represent a content of a drawing image drawn by a user, or a non-drawing image displayed by a user, for example. The electronic whiteboard 2 is an example of a shared terminal to be shared by a plurality of users, such that the plurality of users can view the same image at a same time. The IC card 3 and the smart phone 4 are an example of a privately-owned terminal, privately owned by each user. Preferably, the privately-owned terminal is a portable terminal, which is easily carried with the user, such as to the meeting. The MFP 9 is an example of a printer. The PC 10 is an example of an individual terminal operated by an individual user. Examples of the PC 10 include a desktop PC, a notebook PC, and a tablet. In this disclosure, the individual terminal is a terminal that is operated by the user such as a terminal owned by the user. The PC 10 does not have to be brought to the meeting, as long as the user is able to access his or her email address using the PC 10.

Further, the image data may be generated not only in PRCS, but in any other desired format such as a printer control language (PCL), page description language (PDL), or Post Script (PS).

In FIG. 1, the user A, who owns the IC card 3, brings the IC card 3 to a meeting being held with the electronic whiteboard 2. The user B, who owns the smart phone 4, brings the smart phone 4 to the meeting being held with the electronic whiteboard 2. The PC 10a is any PC owned by the user A. The PC 10b is any PC owned by the user B. In one example, the electronic whiteboard 2 may have a videoconference capability, to carry out a videoconference with the videoconference terminal 13 by communicating video data and audio data through the communication network 100.

The terminal management server 5 manages, for each privately-owned terminal, terminal identification (ID) identifying the privately-owned terminal. The destination management server 6 manages an email address of the user. In this example, the user is able to check his or her emails through the PC 10 individually owned by each user. More specifically, the destination management server 6 stores an email address of the user in association with a user ID of the user. The mail server 7 controls transmission or reception of electronic mails (emails) through the communication network 100. The print server 8 stores data reflecting the image data transmitted from the electronic whiteboard 2 or PC 10 (in this disclosure, print data), and, in response to a request from the MFP 9, transmits the data reflecting the image data to the MFP 9.

<Hardware Configuration>

Referring to FIGS. 2 to 7, a hardware configuration of the apparatus or terminal in the communication system 1 is described according to the embodiment.

<Hardware Configuration of Electronic Whiteboard>

Figure 2:
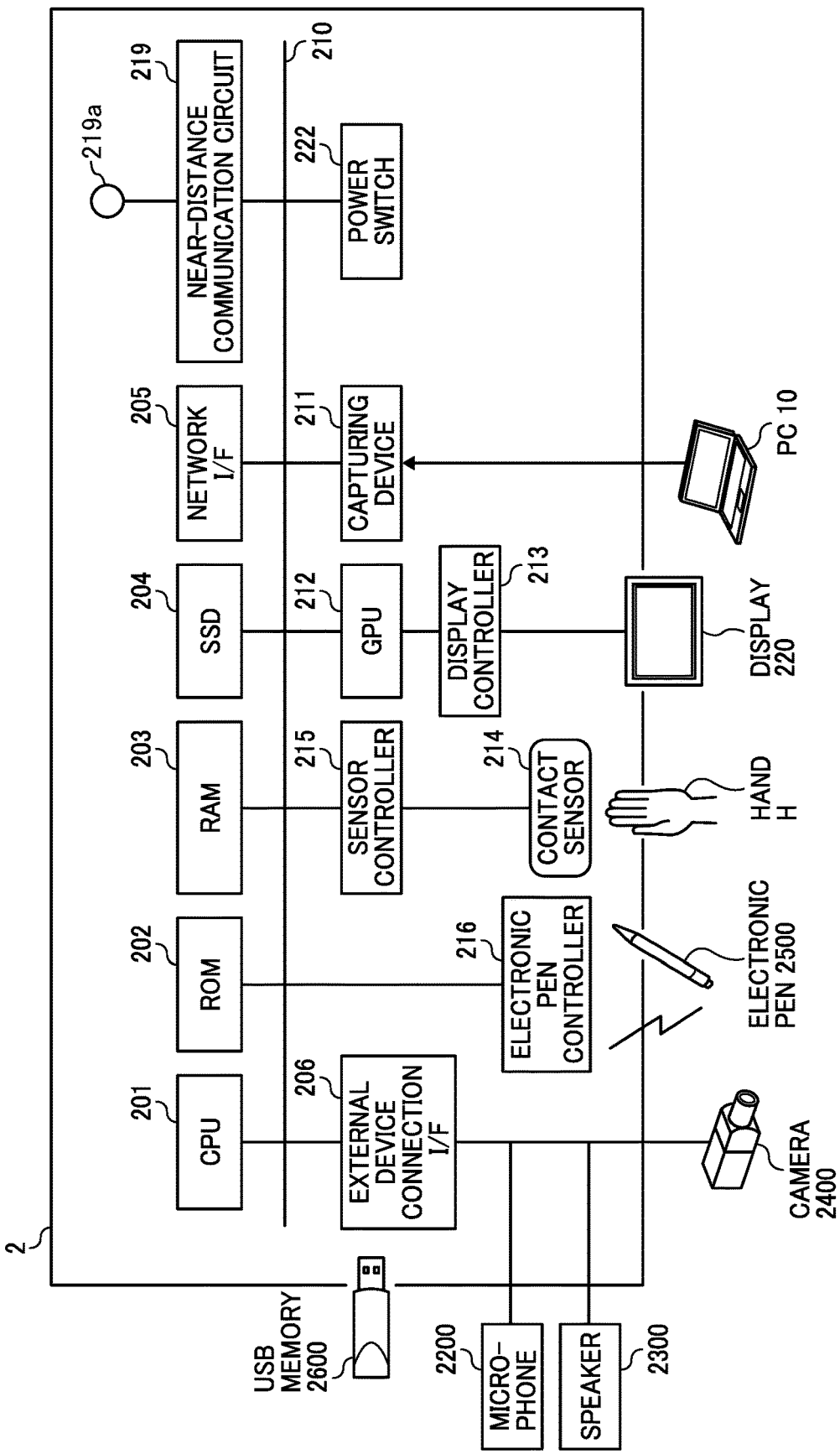
FIG. 2 is a schematic block diagram illustrating a hardware configuration of an electronic whiteboard, according to an embodiment.

FIG. 2 is a diagram illustrating a hardware configuration of the electronic whiteboard 2, according to the embodiment. As illustrated in FIG. 2, the electronic whiteboard 2 includes a central processing unit (CPU) 201, a read only memory (ROM) 202, a random access memory (RAM) 203, a solid state drive (SSD) 204, a network interface (I/F) 205, and an external device connection interface (I/F) 206.

The CPU 201 controls entire operation of the electronic whiteboard 2. The ROM 202 stores a control program for operating the CPU 201 such as an Initial Program Loader (IPL). The RAM 203 is used as a work area for the CPU 201. The SSD 204 stores various data such as the control program for the electronic whiteboard 2. The network I/F 205 controls communication with an external device through the communication network 100. The external device connection I/F 206 controls communication with a USB memory 2600, and external devices such as a camera 2400, a speaker 2300, a microphone 2200, etc.

The electronic whiteboard 2 further includes a capturing device 211, a graphics processing unit (GPU) 212, a display controller 213, a contact sensor 214, a sensor controller 215, an electronic pen controller 216, a near-distance communication circuit 219, an antenna 219a for the near-distance communication circuit 219, and a power switch 222.

The capturing device 211 causes a display 508 of the PC 10 to display a still image or a video image based on image data that is captured by the capturing device 211. The GPU 212 is a semiconductor chip dedicated to processing a graphical image. The display controller 213 controls display of an image processed at the GPU 212 for output through a display 220 provided with the electronic whiteboard 2. The contact sensor 214 detects a touch onto the display 220 with an electronic pen 2500 or a user's hand H. The sensor controller 215 controls operation of the contact sensor 214. The contact sensor 715 senses a touch input to a specific coordinate on the display 220 using the infrared blocking system. More specifically, the display 220 is provided with two light receiving elements disposed on both upper side ends of the display 220, and a reflector frame disposed at the sides of the display 220. The light receiving elements emit a plurality of infrared rays in parallel to a surface of the display 220. The light receiving elements receive lights passing in the direction that is the same as an optical path of the emitted infrared rays, which are reflected by the reflector frame. The contact sensor 214 outputs an identifier (ID) of the infrared ray that is blocked by an object (such as the user's hand) after being emitted from the light receiving elements, to the sensor controller 215. Based on the ID of the infrared ray, the sensor controller 215 detects a specific coordinate that is touched by the object. The electronic pen controller 216 communicates with the electronic pen 2500 to detect a touch by the tip or bottom of the pen 15 to the display 220. The near-distance communication circuit 219 is a communication circuit that communicates in compliance with the NFC, the Bluetooth, and the like.

The power switch 222 turns on or off the power of the electronic whiteboard 2.

The electronic whiteboard 2 further includes a bus line 210. The bus line 210 is an address bus or a data bus, which electrically connects the elements in FIG. 2 such as the CPU 201.

The contact sensor 214 is not limited to the infrared blocking system type, and may be a different type of detector, such as a capacitance touch panel that identifies the contact position by detecting a change in capacitance, a resistance film touch panel that identifies the contact position by detecting a change in voltage of two opposed resistance films, or an electromagnetic induction touch panel that identifies the contact position by detecting electromagnetic induction caused by contact of an object to a display. In addition or in alternative to detecting a touch by the tip or bottom of the pen 15, the electronic pen controller 216 may also detect a touch by another part of the electronic pen 2500, such as a part held by a hand of the user.

<Hardware Configuration of IC Card>

Figure 3:
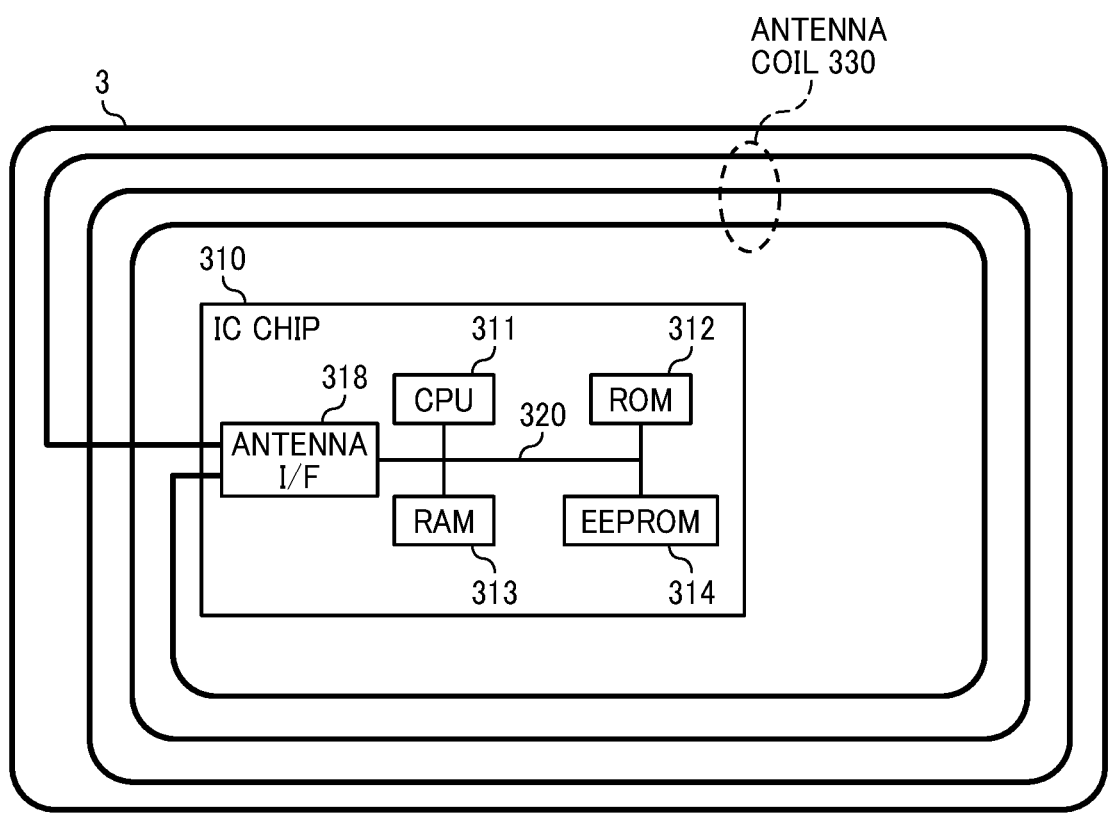
FIG. 3 is a schematic block diagram illustrating a hardware configuration of an integrated circuit (IC) card, according to an embodiment.

FIG. 3 is a diagram illustrating a hardware configuration of the IC card 3 according to the embodiment. In this disclosure, the contactless IC card is described, but contact IC card may be applied instead. As illustrated in FIG. 3, the IC card 3 includes an IC chip 310 and an antenna coil 330. The IC card 3 further includes a CPU 311, a ROM 312, a RAM 313, an Electrically Erasable and Programmable ROM (EEPROM) 314, and an antenna I/F 318.

The CPU 311 controls entire operation of the IC card 3. The ROM 312 stores a control program for operating the CPU 311. The RAM 313 is used as a work area for the CPU 311. The EEPROM 314 stores various data such as the control program for the IC card 3, and terminal ID for identifying the IC card 3, and the like. The antenna I/F 318 controls transmission or reception of data with an external device via the antenna coil 330.

The IC card 3 further includes a bus line 320. The bus line 320 is an address bus or a data bus, which electrically connects the elements in FIG. 3 such as the CPU 311.

The antenna coil 330 generates an electric current, which is induced as the IC card 3 passes an electromagnetic field generated by radio waves emitted from an external device such as a reader and writer. The IC card 3 uses the generated electric current to activate the IC chip 310, and communicates with the external device, that is the reader and writer, to obtain or provide data with the external device.

<Hardware Configuration of Smart Phone>

Figure 4:
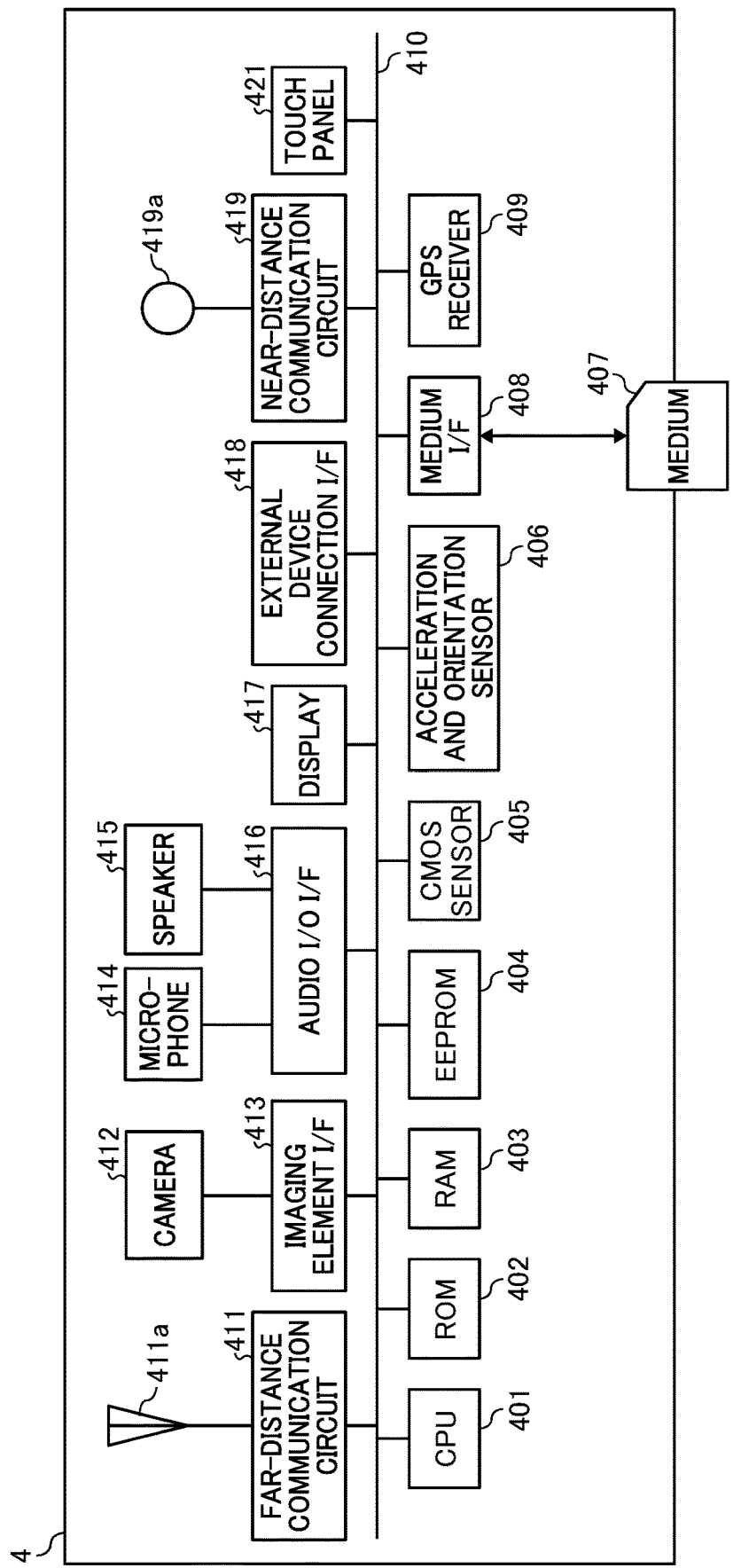
FIG. 4 is a schematic block diagram illustrating a hardware configuration of a smart phone, according to an embodiment.

FIG. 4 is a diagram illustrating a hardware configuration of the smart phone 4 according to the embodiment. As illustrated in FIG. 4, the smart phone 4 includes a CPU 401, a ROM 402, a RAM 403, an EEPROM 404, a Complementary Metal Oxide Semiconductor (CMOS) sensor 405, an acceleration and orientation sensor 406, a medium I/F 408, and a GPS receiver 409.

The CPU 401 controls entire operation of the smart phone 4. The ROM 402 stores a control program for controlling the CPU 401 such as an IPL. The RAM 403 is used as a work area for the CPU 401. The EEPROM 404 reads or writes various data such as a control program for the smart phone 4 under control of the CPU 401. The CMOS sensor 405 captures an object (mainly, the user operating the smart phone 4) under control of the CPU 401 to obtain captured image data. The acceleration and orientation sensor 406 includes various sensors such as an electromagnetic compass or gyrocompass for detecting geomagnetism, and an acceleration sensor. The medium I/F 408 controls reading or writing of data with respect to a recording medium 407 such as a flash memory. The GPS receiver 409 receives a GPS signal from a GPS satellite.

The smart phone 4 further includes a far-distance communication circuit 411, a camera 412, an imaging element I/F 413, a microphone 414, a speaker 415, an audio input/output I/F 416, a display 417, an external device connection I/F 418, a near-distance communication circuit 419, an antenna 419a for the near-distance communication circuit 419, and a touch panel 421.

The far-distance communication circuit 411 is a circuit that communicates with other device through the communication network 100. The camera 412 is an example of imaging device capable of capturing a subject under control of the CPU 401, and is incorporated in the smart phone 4. The imaging element i/F 413 is a circuit that controls driving of the camera 412. The microphone 414 is an example of audio collecting device capable of inputting audio under control of the CPU 401, and is incorporated in the smart phone 4. The audio I/O I/F 416 is a circuit for inputting or outputting an audio signal between the microphone 414 and the speaker 415 under control of the CPU 401. The display 417 may be a liquid crystal or organic electro luminescence (EL) display that displays an image of a subject, an operation icon, or the like. The external device I/F 418 is an interface circuit that connects the smart phone 4 to various external devices. The near-distance communication circuit 419 is a communication circuit that communicates in compliance with the NFC, the Bluetooth, and the like. The touch panel 421 is an example of input device that enables the user to input a user instruction through touching a screen of the display 417.

The smart phone 4 further includes a bus line 410. The bus line 410 is an address bus or a data bus, which electrically connects the elements in FIG. 4 such as the CPU 401.

<Hardware Configuration of Server and PC>

Figure 5:
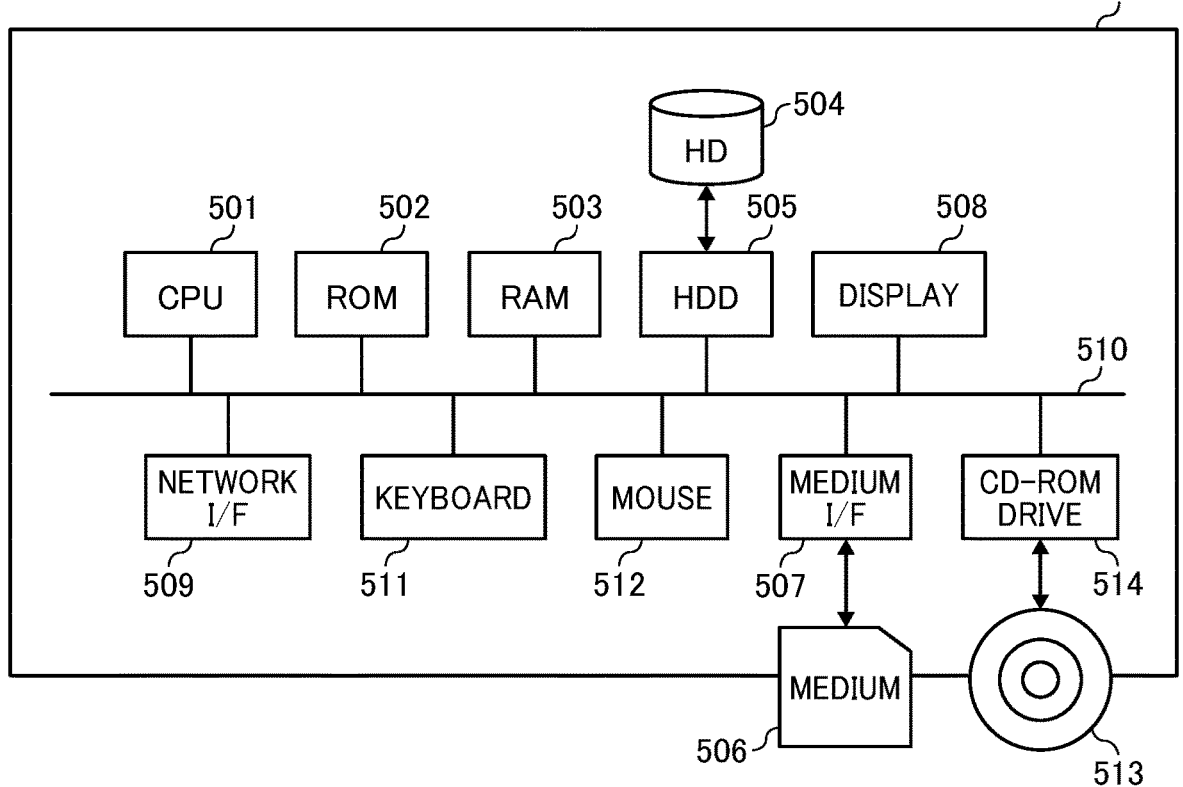
FIG. 5 is a schematic block diagram illustrating a hardware configuration of a personal computer (PC), according to an embodiment.

FIG. 5 is a diagram illustrating a hardware configuration of the server and the PC, according to the embodiment. In this disclosure, since the terminal management server 5, destination management server 6, mail server 7, print server 8, PC 10a, and PC 10b have a substantially the same hardware structure, a hardware configuration of the terminal management server 5 is described below as an example. In the following description, even in case of describing the hardware configuration of the destination management server 6, mail server 7, print server 8, PC 10a, and PC 10b, the elements in FIG. 5 are referred.

As illustrated in FIG. 5, the terminal management server 5, which may be implemented by a computer, includes a CPU 501, a ROM 502, a RAM 503, a hard disk (HD) 504, a hard disk drive (HDD) 505, a recording medium 506, a medium I/F 507, a display 508, a network I/F 509, a keyboard 511, a mouse 512, a CD-ROM drive 514, and a bus line 510. Since the terminal management server 5 operates as a server, an input device such as the keyboard 511 and the mouse 512, or an output device such as the display 508 does not have to be provided.

The CPU 501 controls entire operation of the terminal management server 5. The ROM 502 stores a control program for controlling the CPU 501 such as an IPL. The RAM 503 is used as a work area for the CPU 501. The HD 504 stores various data such as a control program. The HDD 505 controls reading or writing of various data to or from the HDD 504 under control of the CPU 501. The medium I/F 507 controls reading or writing of data with respect to a recording medium 506 such as a flash memory. The display 508 displays various information such as a cursor, menu, window, characters, or image. The network I/F 509 is an interface that controls communication of data with an external device through the communication network 100. The keyboard 511 is one example of input device provided with a plurality of keys for allowing a user to input characters, numerals, or various instructions. The mouse 512 is one example of input device for allowing the user to select a specific instruction or execution, select a target for processing, or move a curser being displayed. The CD-ROM drive 514 reads or writes various data with respect to a Compact Disc ROM (CD-ROM) 513, which is one example of removable recording medium.

The terminal management server 5 further includes a bus line 510. The bus line 510 may be an address bus or a data bus, which electrically connects various elements such as the CPU 501 of FIG. 5.

<Hardware Configuration of MFP>

Figure 6:
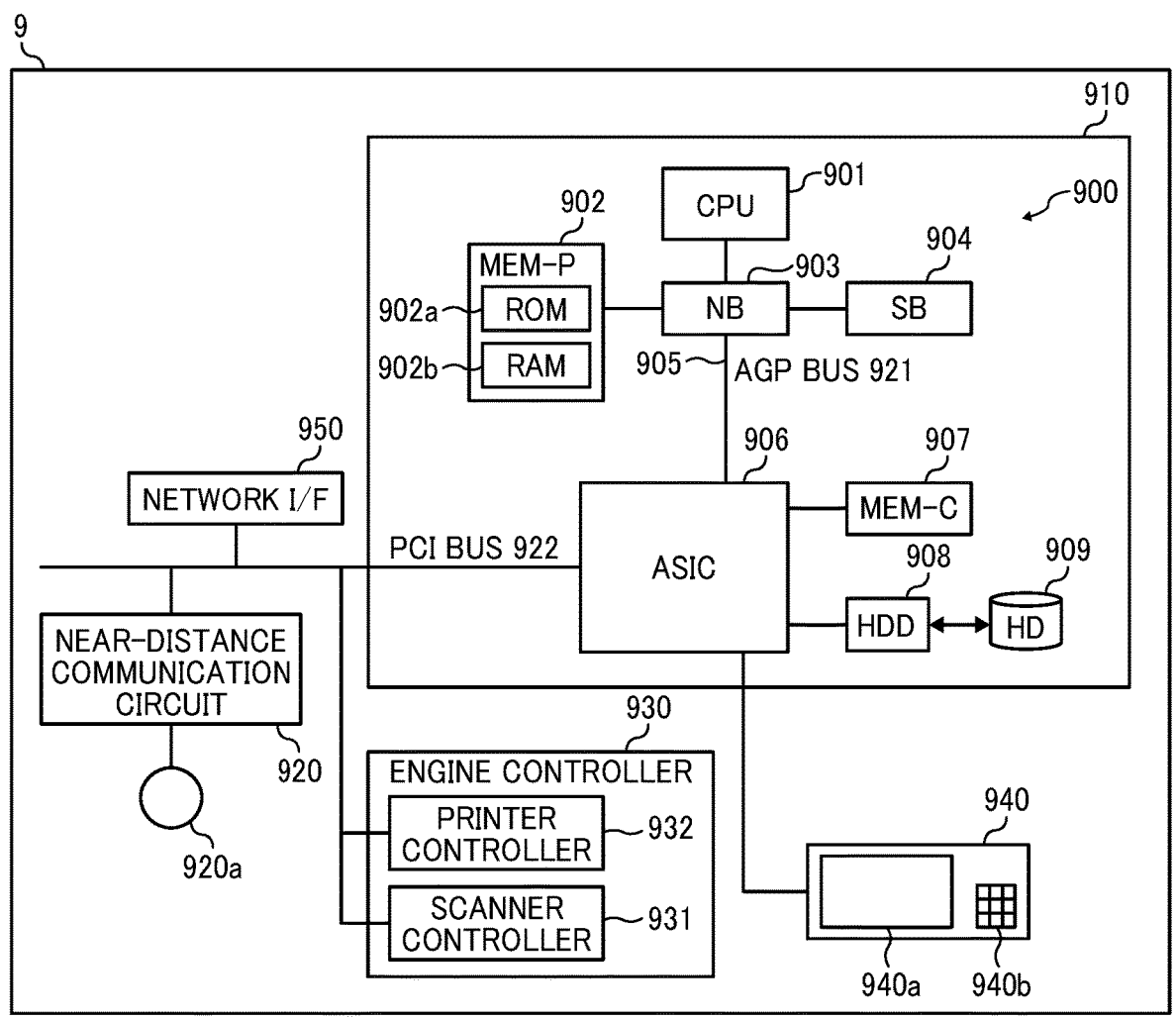
FIG. 6 is a schematic block diagram illustrating a hardware configuration of a multifunctional peripheral (MFP), according to an embodiment.

FIG. 6 is a diagram illustrating a hardware configuration of the MFP 9, according to the embodiment. As illustrated in FIG. 6, the MFP 9 includes a controller 901, a near-distance communication circuit 920, an engine controller 930, a control panel 940, and a network I/F 950.

The controller 910 includes a CPU 901 as a main processor, a system memory (MEM-P) 902, a north bridge (NB) 903, a south bridge (SB) 904, an Application Specific Integrated Circuit (ASIC) 906, a local memory (MEM-C) 907, a HDD 908, and a HD 909. The NB 903 and the ASIC 906 are connected through an Accelerated Graphics Port (AGP) bus 921.

The CPU 901 controls entire operation of the MFP 9. The NB 903 connects the CPU 901, with the MEM-P 902, SB 904, and AGP bus 921. The NB 903 includes a memory controller for controlling reading or writing of various data with respect to the MEM-P 902, a Peripheral Component Interconnect (PCI) master, and an AGP target.

The MEM-P 902 includes a ROM 902a as a memory that stores program and data for achieving various functions of the controller 910. The MEM-P 902 further includes a RAM 902b as a memory that deploys the program and data, or as a drawing memory that stores drawing data for printing. The program stored in the RAM 902b may be stored in any computer-readable recording medium, such as a CD-ROM, floppy disk (FD), CD-R, or DVD, in a file format installable and executable by the computer, for distribution.

The SB 904 connects the NB 903 with a PCI bus 922 or a peripheral device. The ASIC 906 is an integrated circuit (IC) privately-owned to image processing, and connects the AGP bus 905, PCI bus 922, HDD 908, and MEM-C 907. The ASIC 906 includes a PCI target, an AGP master, an arbiter (ARB) as a central processor, a memory controller for controlling the MEM-C 907, a plurality of direct memory access controllers (DMACs) capable of converting coordinates of image data with a hardware logic, and a PCI unit that transfers data between the scanner controller 931 and the printer controller 932 through the PCI bus 922. The ASIC 906 may be connected to a Universal Serial Bus (USC) interface, or the Institute of Electrical and Electronics Engineers 1394 (IEEE1394) interface.

The MEM-C 907 is a local memory, which is used as a buffer for image data to be printed or code image. The HD 909 stores various image data, font data for printing, and form data. The HDD 908 reads or writes various data from or to the HD 909 under control of the CPU 901. The AGP bus 921 is a bus interface for a graphics accelerator card, which has been proposed to accelerate graphics processing. Through directly accessing the MEM-P 902 by high-throughput, processes by the AGP bus 921 can be accelerated.

The near-distance communication circuit 920 is provided with an antenna 920a for the near-distance communication circuit 920. The near-distance communication circuit 920 is a communication circuit that communicates in compliance with the NFC, the Bluetooth, and the like.

The engine controller 930 includes a scanner controller 931 and a printer controller 932. The control panel 940 includes a display 940a and various keys 940b. The control panel 940 displays current settings or a selection screen, and is provided with a touch panel for receiving a user input. The keys 940b, which include such as a ten key and a Start key, are used by the user to enter set values of various image forming parameters such as image density parameter. The controller 910 controls entire operation of the MFP 9. In example operation, the controller 910 controls drawing, communication, or user inputs to the control panel 940. The scanner controller 931 and the printer controller 932 each perform various image processing, such as error diffusion or gamma conversion.

In response to an instruction to select a specific application through the control panel 940, for example, using a mode switch key, the MFP 9 selectively performs a document box function, copy function, print function, and facsimile function. When the document box function is selected, the MFP 9 changes its operating mode to a document box mode to store document data. With selection of the copy function, the MFP 90 operates in a copy mode. With selection of the print function, the MFP 9 operates in a printer mode. With selection of the facsimile function, the MFP 9 operates in a facsimile mode.

The network I/F 950 controls communication of data with an external device through the communication network 100. The near-distance communication circuit 920 and the network I/F 950 are electrically connected to the ASIC 906 via the PCI bus 922.

<Hardware Configuration of Videoconference Terminal>

Figure 7:
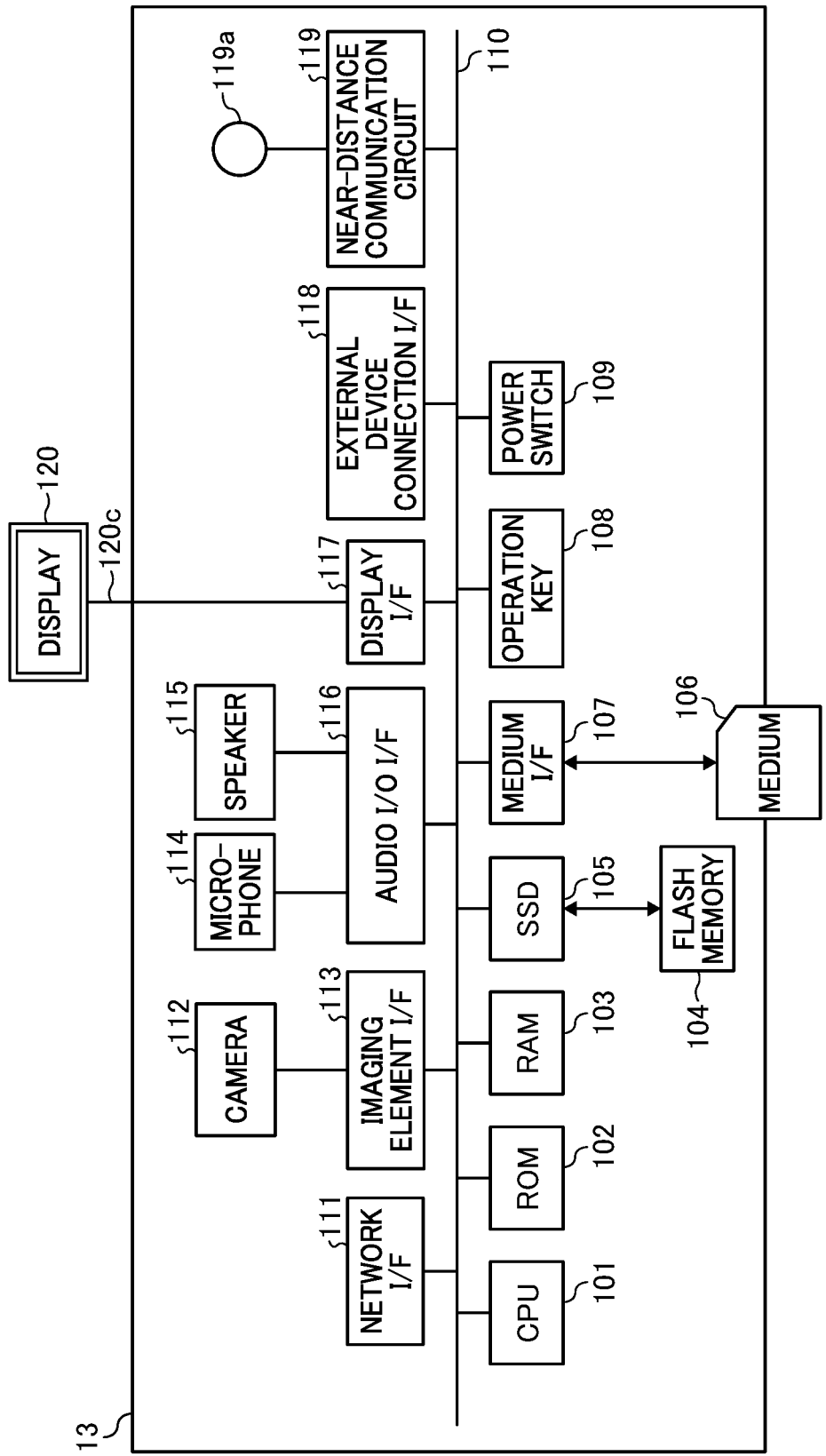
FIG. 7 is a schematic block diagram illustrating a hardware configuration of a videoconference terminal, according to an embodiment.

FIG. 7 is a diagram illustrating a hardware configuration of the videoconference terminal 13 according to the embodiment. As illustrated in FIG. 7, the videoconference terminal 13 includes a CPU 101, a ROM 102, a RAM 103, a flash memory 104, a SSD 105, a medium I/F 107, an operation key 108, a power switch 109, a bus line 110, a network I/F 111, a camera 112, an imaging element i/F 113, a microphone 114, a speaker 115, an audio input/output I/F 116, a display I/F 117, an external device connection I/F 118, a near-distance communication circuit 119, and an antenna 119a for the near-distance communication circuit 119. The CPU 101 controls entire operation of the videoconference terminal 13. The ROM 102 stores a control program for controlling the CPU 101 such as an IPL. The RAM 103 is used as a work area for the CPU 101. The flash memory 104 stores various data such as a communication control program, image data, and audio data. The SSD 105 controls reading or writing of various data to or from the flash memory 104 under control of the CPU 101. In alternative to the SSD, a hard disk drive (HDD) may be used. The medium I/F 107 controls reading or writing of data with respect to a recording medium 106 such as a flash memory. The operation key (keys) 108 is operated by a user to input a user instruction such as a user selection of a communication destination of the videoconference terminal 13. The power switch 109 is a switch that receives an instruction to turn on or off the power of the videoconference terminal 13.

The network I/F 111 allows communication of data with an external device through the communication network 100 such as the Internet. The camera 112 is an example of built-in imaging device capable of capturing a subject under control of the CPU 101. The imaging element i/F 113 is a circuit that controls driving of the camera 112. The microphone 114 is an example of built-in audio collecting device capable of inputting audio under control of the CPU 101. The audio I/O I/F 116 is a circuit for inputting or outputting an audio signal between the microphone 114 and the speaker 115 under control of the CPU 101. The display I/F 117 is a circuit for transmitting image data to an external display 120 under control of the CPU 101. The external device connection I/F 118 is an interface circuit that connects the videoconference terminal 13 to various external devices. The near-distance communication circuit 119 is a communication circuit that communicates in compliance with the NFC, the Bluetooth, and the like.

The bus line 110 may be an address bus or a data bus, which electrically connects various elements such as the CPU 101 of FIG. 7.

The display 120 is an example of a displaying unit, such as a liquid crystal or organic electroluminescence (EL) display that displays an image of a subject, an operation icon, or the like. The display 120 is connected to the display I/F 117 by a cable 120c. The cable 120c may be an analog red green blue (RGB) (video graphic array (VGA)) signal cable, a component video cable, a high-definition multimedia interface (HDMI) signal cable, or a digital video interactive (DVI) signal cable.

The camera 112 includes a lens and a solid-state imaging element that converts an image (video) of a subject to electronic data by converting light to electric charge. As the solid-state imaging element, for example, a complementary metal-oxide-semiconductor (CMOS) or a charge-coupled device (CCD) is used. The external device connection I/F 118 is capable of connecting an external device such as an external camera, an external microphone, or an external speaker through a USB cable or the like. In the case where an external camera is connected, the external camera is driven in preference to the built-in camera 112 under control of the CPU 101. Similarly, in the case where an external microphone is connected or an external speaker is connected, the external microphone or the external speaker is driven in preference to the built-in microphone 114 or the built-in speaker 115 under control of the CPU 101.

The recording medium 106 is removable from the videoconference terminal 13. The recording medium 106 can be any non-volatile memory that reads or writes data under control of the CPU 101, such that any memory such as an EEPROM may be used instead of the flash memory 104.

<Example Screens of Electronic Whiteboard>

Figure 8A:
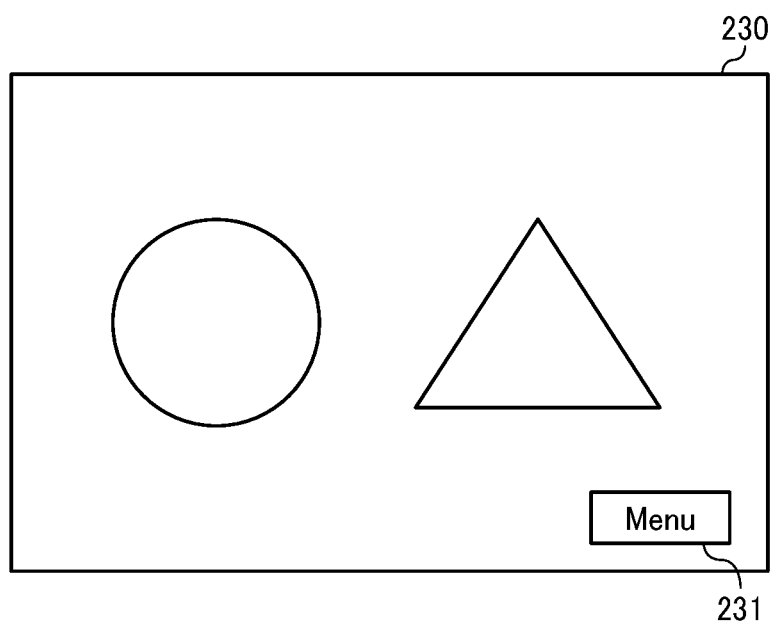
FIGS. 8A and 8B (FIG. 8) are an illustration of example screens displayed by a display at the electronic whiteboard.
Figure 8B:
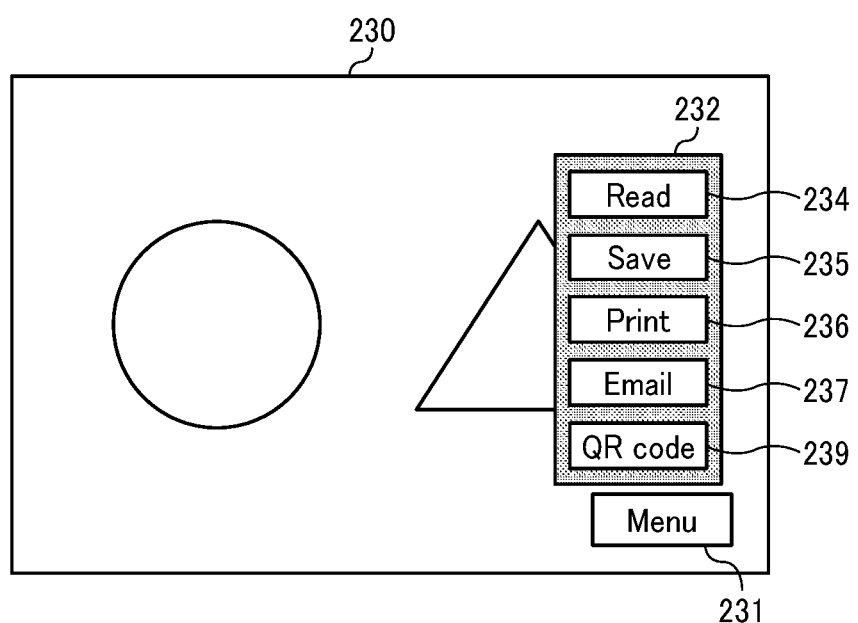

Referring to FIGS. 8 to 10, example screens of the electronic whiteboard 2 are described according to the embodiment. FIGS. 8 to 10 each illustrate a screen displayed by the electronic whiteboard 2. The electronic whiteboard 2 displays, on the display 220, a drawing image screen 230 as illustrated in FIG. 8A, for example. The drawing image screen 230 displays a drawing image (such as a circle and a triangle in figure) drawn by the user with such as the electronic pen 2500. The drawing image screen 230 displays a "Menu" button 231 at the lower right. The "Menu" button 231 is a graphical image, when selected by the user, performs various types of functions of the electronic whiteboard 2. When the user presses the "Menu" button 231 with such as the electronic pen 2500, as illustrated in FIG. 8B, the electronic whiteboard 2 displays, on the drawing image screen 230, a menu selection window (image) 232 for allowing selection of a function provided by the electronic whiteboard 2.

As illustrated in FIG. 8B, the menu selection window 232 includes a "Read" button 234, a "Save" button 235, a "Print" button 236, an "Email" button 237, and a "QR code" button 239.

Of those buttons, the "Read" button 234 is a graphical image, which, when selected, causes the electronic whiteboard 2 to read drawing image data that is stored in the SSD 204 after the image is drawn, for display onto the display 220. The "Save" button 235 is a graphical image, which, when selected, causes the electronic whiteboard 2 to store the drawing image drawn by the user in the SSD 204 as the drawing image data. The "Print" button 236 is a graphical image, which, when selected, causes the electronic whiteboard 2 to print the drawing image displayed on the drawing image screen 230 using such as the MFP 9. The "Email" button 237 is a graphical image, which, when selected, causes the electronic whiteboard 2 to transmit the drawing image displayed on the drawing image screen 230, as the drawing image data attached to the email. The "QR code" button 239 is a graphical image, which, when selected, causes the electronic whiteboard 2 to display, on the display 220, a QR code embedded with a device ID identifying the own device (that is, the electronic whiteboard 2).

Next, example screens to be displayed by the electronic whiteboard 2 when the buttons 234 to 237 and 239 are respectively selected, are described.

Figure 9A:
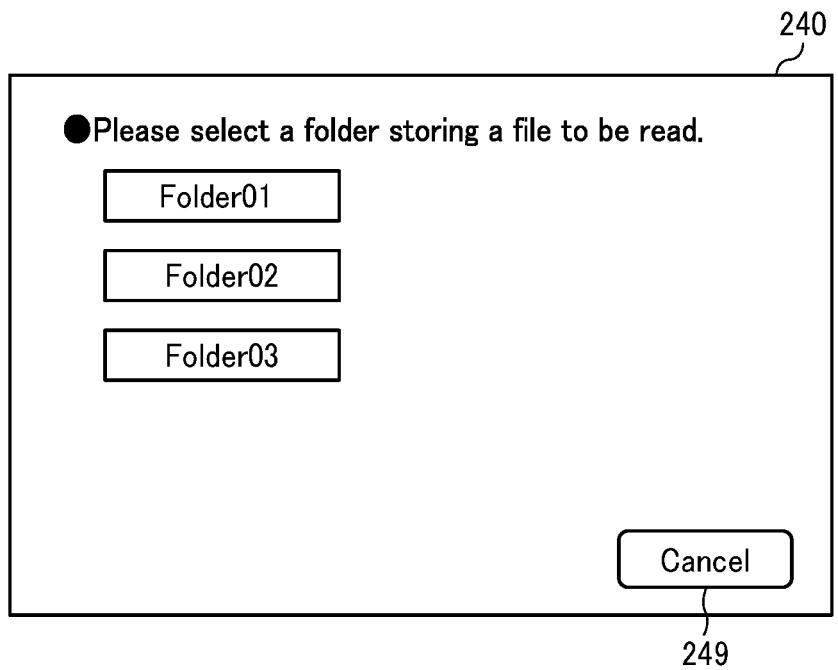
FIGS. 9A, 9B, 9C, and 9D (FIG. 9) are an illustration of example screens displayed by the display at the electronic whiteboard.
Figure 9B:
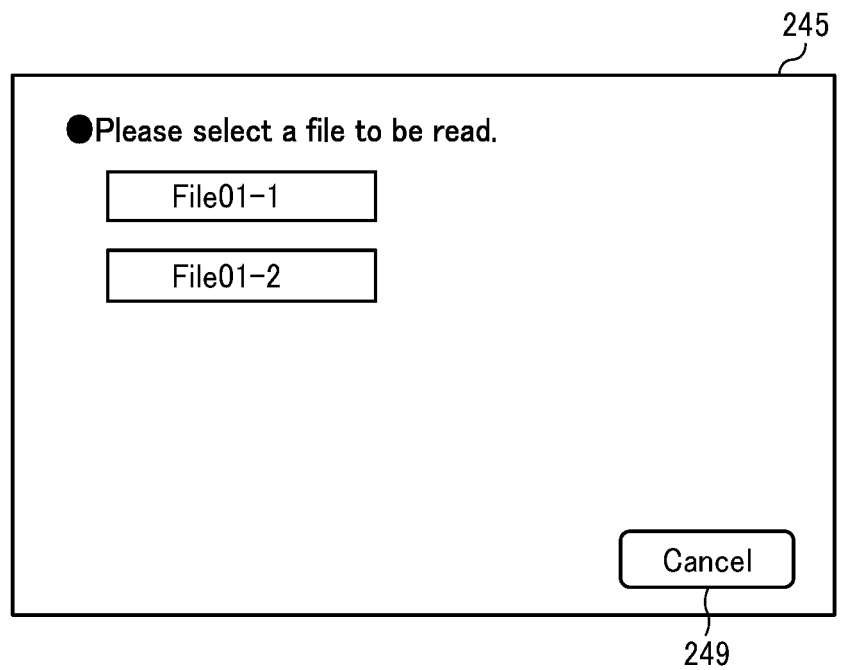

In response to pressing of the "Read" button 234 by the user, the electronic whiteboard 2 controls the display 220 to display a folder selection screen 240 as illustrated in FIG. 9A. The folder selection screen 240 displays a plurality of folder icons to be used for selecting a folder storing an electronic file to be read. When the user selects a desired folder icon ("folder 01", for example) with the electronic pen 2500, the electronic whiteboard 2 displays, on the display 220, a file selection screen 245 as illustrated in FIG. 9B. The file selection screen 245 displays a plurality of file icons to be used for selecting an electronic file to be read. When the user selects a desired file icon with the electronic pen 2500, the electronic whiteboard 2 displays, on the display 220, a drawing image screen 230 including a drawing image of the selected file, as illustrated in FIG. 8A.

Figure 9C:
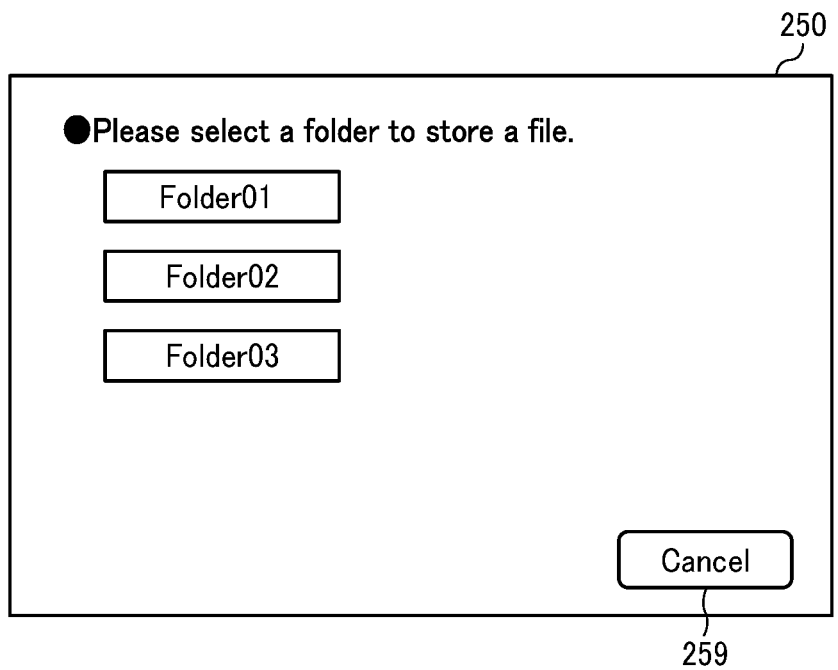

In response to pressing of the "Save" button 235 by the user, the electronic whiteboard 2 controls the display 220 to display a folder selection screen 250 as illustrated in FIG. 9C. The folder selection screen 250 displays a plurality of folder icons to be used for selecting a folder to store an electronic file. The user selects the folder to store the electronic file, by selecting a desired folder icon with the electronic pen 2500.

Figure 9D:
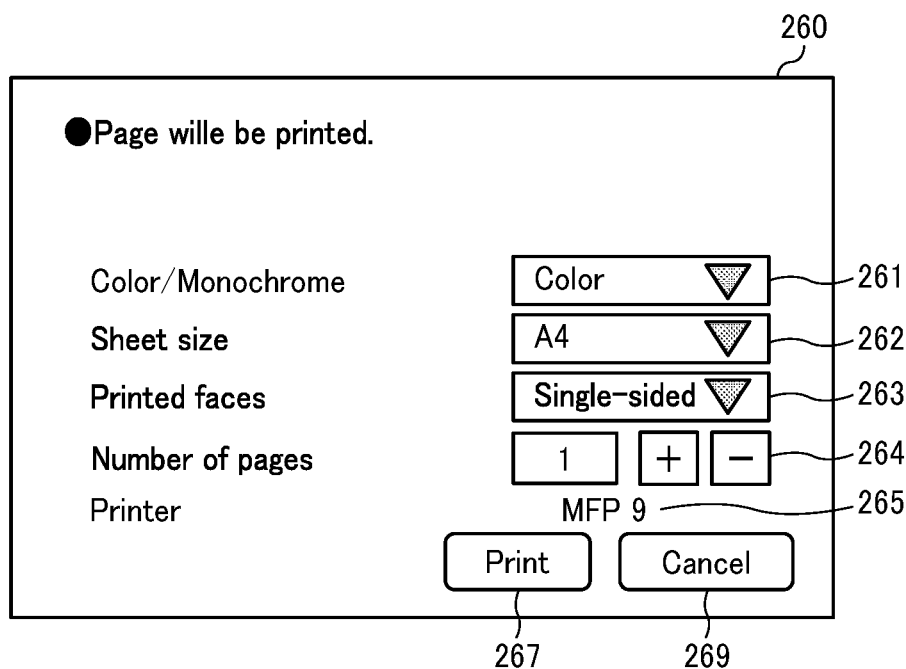

In response to pressing of the "Print" button 236 by the user, the electronic whiteboard 2 controls the display 220 to display a print configuration screen 260 as illustrated in FIG. 9D. The print configuration screen 260 displays various types of print parameters, and a pull-down menu to be used for changing a configuration for each of the print parameters. The print configuration screen 260 includes the menus 261 to 264, respectively, for selecting color or monochrome printing, selecting a sheet size (A4, A3, etc.), selecting faces to be printed (single-sided or duplex), and selecting the increase or decrease of a number of pages to be printed. The print configuration screen 260 further displays, in a field 265, a device name identifying a printer to print (in this example, "MFP 9"). The print configuration screen 260 displays a "Print" button 267 to be pressed by the user to start printing. For each of the screens illustrated in FIGS. 9A, 9B, 9C, and 9D, "Cancel" buttons 249, 259, and 269 are displayed to return to the drawing image screen 230 illustrated in FIG. 8A.

Figure 10A:
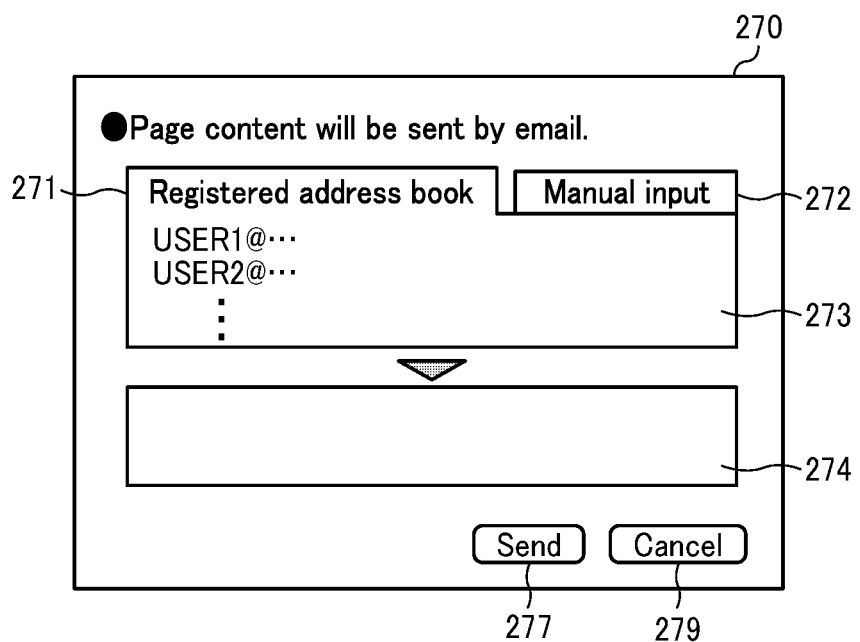
FIGS. 10A, 10B, 10C, and 10D (FIG. 10) are an illustration of example screens displayed by the display at the electronic whiteboard.
Figure 10B:
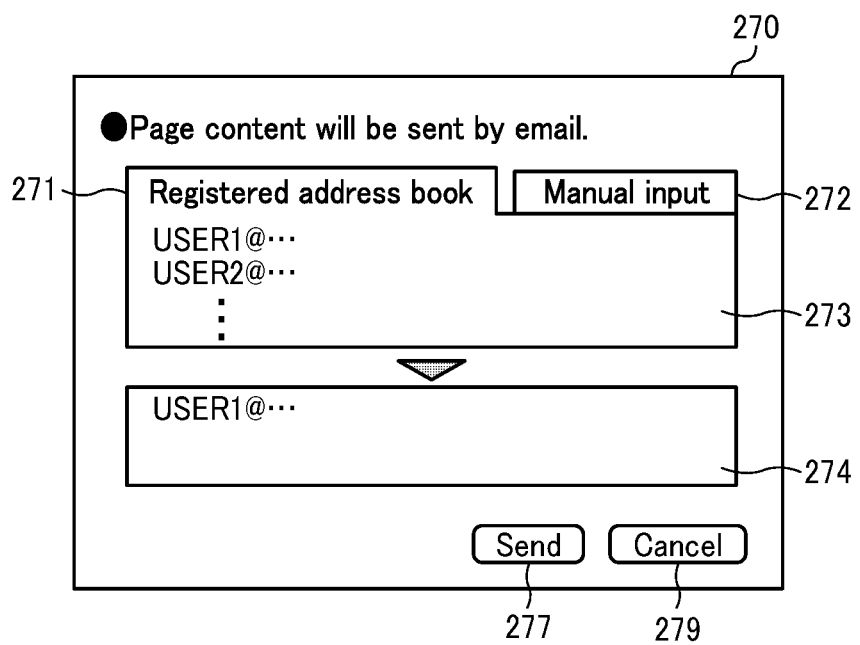
Figure 10C:
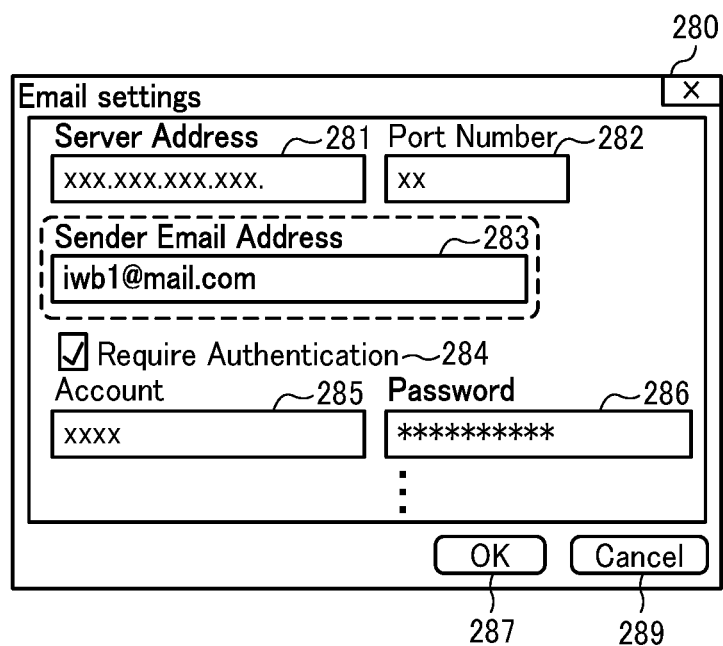

In response to pressing of the "Email" button 237 by the user, the electronic whiteboard 2 controls the display 220 to display a destination configuration screen 270 illustrated in FIG. 10A. The destination configuration screen 270 includes a "Registered address book" tab 271 for showing registered email addresses, and a "Manual input" tab 272 for allowing the user to manually input an email address with such as the electronic pen 2500. In this example, a case where the "Registered address book" tab 271 is selected is displayed. The destination configuration screen 270 displays a registered address book field 273 that lists the registered email addresses. When the user selects a desired email address (in this example, "USER1 @ . . . ") with the electronic pen 2500, the electronic whiteboard 2 displays the email address selected by the user in an address configuration field 274 as illustrated in FIG. 10B. The destination configuration screen 270 displays a "Send" button 277 to be selected by the user to start transmission of email. In another example, the electronic whiteboard 2 may display an email configuration screen 280 as illustrated in FIG. 10C, as a screen to be displayed to an administrator or a service engineer, but not to the general user. The email configuration screen 280 includes a server address field 281, a port number field 282, a sender email address field 283, an authentication requirement field 284, an account field 285, and a password field 286.

The server address field 281 is a field to be entered with an IP address of the mail server 7. The port number field 282 is a field to be entered with a port number of a port that the mail server 7 opens to accept emails. The sender email field 283 is previously set with an email address assigned to the electronic whiteboard 2, as the electronic whiteboard 2 is an email sender. That is, the email sender is not a user operating the electronic whiteboard 2, but is previously set as the electronic whiteboard 2. The authentication requirement field 286 is a field to be set with information indicating whether or not to request the mail server 7 to authenticate the email sender. The account field 285 and the password field 286 are entered with account information, which is to be used by the mail server 7 to authenticate the electronic whiteboard two using Send Mail Transfer Protocol (SMTP).

Figure 10D:
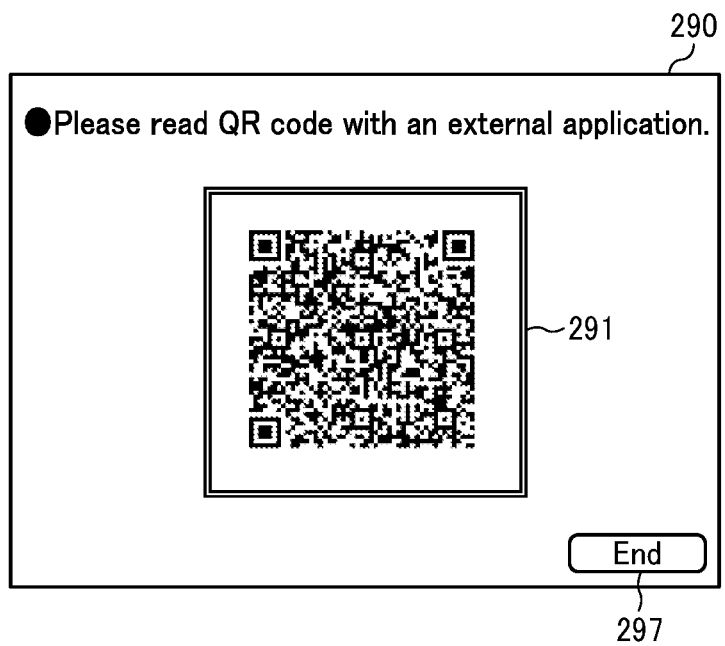

In response to pressing of the "QR code" button 239 by the user, the electronic whiteboard 2 controls the display 220 to display a QR code display screen 290 as illustrated in FIG. 10D. The QR code display screen 290 displays a QR code 291 embedded with the device ID for identifying the electronic whiteboard 2 (the own device). For example, the user activates a QR code reader application installed on such as the smart phone, to cause the activated reader application to read the QR code 291 to obtain the device ID. The QR code display screen 290 further includes an "End" button 297, which switches back from the QR code display screen 290 to the drawing image screen 230. For each of the screens illustrated in FIGS. 10A, 10B, and 10C, "Cancel" buttons 279 and 289 are displayed to return to the drawing image screen 230 illustrated in FIG. 8A.

Any one of the IDs described above is an example of identification information identifying the device or terminal, or the user operating the device or terminal. In alternative to the device ID or terminal ID for identifying a specific device, a manufacturing number may be used as identification information for identifying the device or terminal. In alternative to the user ID identifying a specific user, an employee number, a driver license number, and an individual number called "My Number" under the Japan's Social Security and Tax Number System, may be used as identification information for identifying the user.

Further, any one of the above-described control programs may be recorded in a file in a format installable or executable on a computer-readable recording medium for distribution. Examples of the recording medium include, but not limited to, a compact disc-recordable (CD-R), digital versatile disc (DVD), blue-ray disc, and SD card. In addition, such recording medium may be provided in the form of a program product to users within a certain country or outside that country.

The servers 5, 6, 7, and 8 may be configured by a single computer or a plurality of computers to which divided portions (functions, means, or storages) are arbitrarily allocated.

<Functional Configuration of Communication System>

Figure 11B:
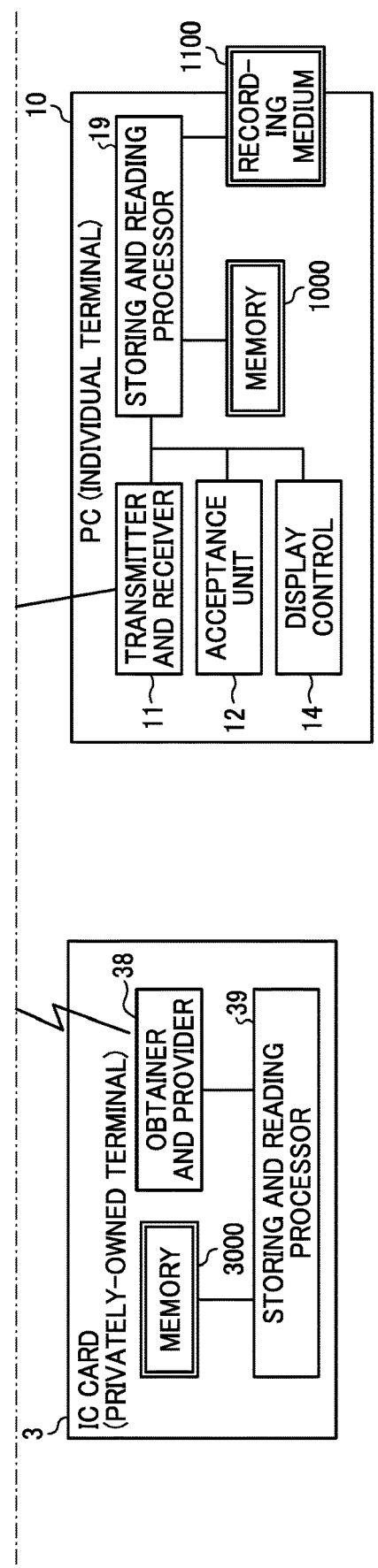

Referring to FIGS. 11 and 12, a functional configuration of the communication system 1 is described according to the embodiment. FIG. 11 is a diagram illustrating a functional configuration of the communication system 1. In FIG. 11, only a part of those terminals, devices, and servers illustrated in FIG. 1 is illustrated, which relates to processing or operation of transmitting drawing image data via email, as described below. In other words, the electronic whiteboard 2y, videoconference terminal 13, print server 8, and MFP 9 do not have to be provided. Since the IC card 3 and the smart phone 4 both have the same function of providing the terminal ID identifying the own device, to the electronic whiteboard 2, the example case of using the IC card 3 is described in the following embodiment referring to FIG. 11.

<Functional Configuration of Electronic Whiteboard>

As illustrated in FIG. 11, the electronic whiteboard 2 includes a transmitter and receiver 21, an acceptance unit 22, an image and audio processor 23, a display control 24, a determiner 24, a first generator 26a, a second generator 26b, an obtainer and provider 28, and a storing and reading processor 29. These units are functions that are implemented by or that are caused to function by operating any of the elements illustrated in FIG. 2 in cooperation with the instructions of the CPU 201 according to the electronic whiteboard control program expanded from the SSD 204 to the RAM 203. The electronic whiteboard 2 further includes a memory 2000, which is implemented by the RAM 203 and SSD 204 illustrated in FIG. 2.

(Each Functional Unit of Electronic Whiteboard)

Next, each functional unit of the electronic whiteboard 2 is described according to the embodiment. The transmitter and receiver 21, which may be implemented by the instructions of the CPU 201, the network I/F 205, and the external device connection I/F 206, illustrated in FIG. 2, transmits or receives various data (or information) to or from other terminal, apparatus, or system through the communication network 100.

The acceptance unit 22, which is implemented by the instructions of the CPU 201, the contact sensor 215, and the electronic pen controller 216, illustrated in FIG. 2, accepts various inputs from the user.

The image and audio processor 23 is implemented by the instructions of the CPU 201, illustrated in FIG. 2. The image and audio processor 23 applies image processing to an image of a subject that has been captured by the camera 2400. After the audio of the user is converted to an audio signal by the microphone 2200, the image and audio processor 23 applies processing to audio data based on this audio signal. The image and audio processor 23 outputs the audio signal according to the audio data to the speaker 2300, and the speaker 2300 outputs audio. The image and audio processor 23 obtains drawing image data, drawn by the user with the electronic pen 2500 or the user's hand H onto the display 220, and converts the drawing image data to coordinate data. For example, when the electronic whiteboard 2x transmits the coordinate data to the whiteboard 2y at another site, the electronic whiteboard 2y controls the display 220 to display a drawing image having the same content based on the received coordinate data.

The display control 24, which is implemented by the instructions of the CPU 201 illustrated in FIG. 2 and by the display controller 213 illustrated in FIG. 2, controls the display 220 to display a drawing image.

The determiner 25, which is implemented by the instructions of the CPU 201 illustrated in FIG. 2, determines whether the electronic whiteboard 2 has received any terminal ID, for example, from the IC card 3 or the smart phone 4.

The first generator 26a, which is implemented by the instructions of the CPU 201 illustrated in FIG. 2, generates image data in such as PRCS, from the drawing image data in bitmap that has been generated based on drawing by the user. The second generator 26b, which is implemented by the instructions of the CPU 201 illustrated in FIG. 2, generates image data in PDF, from the drawing image data in bitmap that has been generated based on drawing by the user.

The obtainer and provider 28, which is implemented by the instructions of the CPU 201 and the near-distance communication circuit 219 with the antenna 219a, illustrated in FIG. 2, communicates with the IC card 3 or the smart phone 4 to obtain or provide data from or to the IC card 3 or the smart phone 4 by near-distance communication.

The storing and reading processor 29, which is implemented by the instructions of the CPU 201 and the SSD 204 illustrated in FIG. 2, performs processing to store various types of data in the memory 2000 or the recording medium 2100 or to read various types of data stored in the memory 2000 or the recording medium 2100. Further, every time image data and audio data are received in performing communication with other electronic whiteboard or videoconference terminal, the memory 2000 overwrites the image data and audio data. The display 220 displays an image based on image data before being overwritten, and the speaker 2300 outputs audio based on audio data before being overwritten. The recording medium 2100 is implemented by the USB memory 2600 illustrated in FIG. 2.

<Functional Configuration of IC Card>

As illustrated in FIG. 11, the IC card 3 includes an obtainer and provider 38, and a storing and reading processor 39. These units are functions that are implemented by or that are caused to function by operating any of the elements illustrated in FIG. 3 in cooperation with the instructions of the CPU 311 according to the IC card control program expanded from the EEPROM 314 to the RAM 313. The IC card 3 further includes a memory 3000, which is implemented by the RAM 313 and the EEPROM 314 illustrated in FIG. 3.

(Each Functional Unit of IC Card)

Next, each functional unit of the IC card 3 is described according to the embodiment. The obtainer/provider 38, which is implemented by the instructions of the CPU 311 and the antenna coil 330 illustrated in FIG. 3, communicates with the electronic whiteboard 2 to obtain or provide data from or to the electronic whiteboard 2 by near-distance communication.

The storing and reading processor 39, which is implemented by the instructions of the CPU 311 illustrated in FIG. 3, performs processing to store various types of data in the memory 3000 or read various types of data stored in the memory 3000. The memory 3000 stores a terminal ID for identifying the IC card 3 as one example of privately-owned terminal. In case the privately-owned terminal is the smart phone 4, the memory 3000 stores a terminal ID for identifying the smart phone 4.

<Functional Configuration of Terminal Management Server>

The terminal management server 5 includes a transmitter and receiver 51, an authenticator 52, and a storing and reading processor 59. These units are functions that are implemented by or that are caused to function by operating any of the elements illustrated in FIG. 5 in cooperation with the instructions of the CPU 501 according to the terminal control program expanded from the HD 504 to the RAM 503. The terminal management server 5 includes a memory 5000 implemented by the HD 504 illustrated in FIG. 5.

(Terminal Management Table)

Figure 12A:
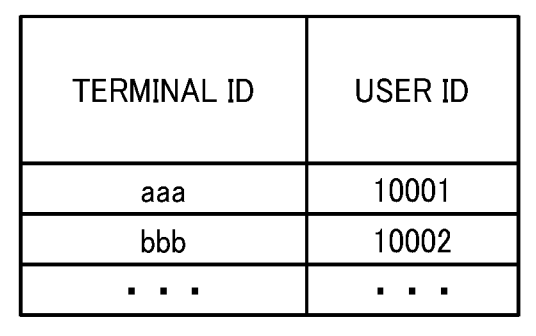

FIG. 12A is a conceptual diagram illustrating a terminal management table according to the embodiment. The memory 5000 stores a terminal management DB 5001, which is implemented by the terminal management table illustrated in FIG. 12A. The terminal management table illustrated in FIG. 12A stores, for each one of a plurality of privately-owned terminals (IC card 3, smart phone 4) registered to the terminal management server 5, a user ID identifying a user who owns the privately-owned terminal in association with the terminal ID identifying the privately-owned terminal.

(Each Functional Unit of Destination Management Server)

Next, each functional unit of the terminal management server 5 is described in detail according to the embodiment. In the following description of the functional configuration of the terminal management server 5, relationships of one or more hardware elements in FIG. 5 with each functional unit of the terminal management server 5 in FIG. 11 will also be described.

The transmitter and receiver 51 of the terminal management server 5 illustrated in FIG. 11, which is implemented by the instructions of the CPU 501 illustrated in FIG. 5 and by the network I/F 509 illustrated in FIG. 5, transmits or receives various types of data (or information) to or from another terminal, device, or system via the communication network 100.

The authenticator 52, which is implemented by the instructions of the CPU 501 illustrated in FIG. 5, determines whether a terminal ID transmitted from the electronic whiteboard 2 is a privately-owned terminal (IC card 3, smart phone 4) owned by the authorized user, which is previously registered.

The storing and reading processor 59, which is implemented by the instructions of the CPU 501 illustrated in FIG. 5 and the HDD 505 illustrated in FIG. 5, performs processing to store various types of data in the memory 5000 or read various types of data stored in the memory 5000.

<Functional Configuration of Destination Management Server>

The destination management server 6 includes a transmitter and receiver 61, and a storing and reading processor 69. These units are functions that are implemented by or that are caused to function by operating any of the elements illustrated in FIG. 5 in cooperation with the instructions of the CPU 501 according to the destination management program expanded from the HD 504 to the RAM 503. The destination management server 6 includes a memory 6000 implemented by the HD 504 illustrated in FIG. 5.

(Destination Management Table)

FIG. 12B is a conceptual diagram illustrating a destination management table according to an embodiment. The memory 6000 stores a destination management DB 6001 implemented by the destination management table illustrated in FIG. 12B. The destination management table stores, for each of one or more registered users being managed by the destination management server 6, a user ID identifying the user and an email address of the user, in association with each other.

(Each Functional Unit of Destination Management Server)

Next, each functional unit of the destination management server 6 is described in detail according to the embodiment. In the following description of the functional configuration of the destination management server 6, relationships of the hardware elements in FIG. 5 with each functional unit of the destination management server 6 in FIG. 11 will also be described.

The transmitter and receiver 61 of the destination management server 6 illustrated in FIG. 11, which is implemented by the instructions of the CPU 501 illustrated in FIG. 5 and by the network I/F 509 illustrated in FIG. 5, transmits or receives various types of data (or information) to or from another terminal, device, or system via the communication network 100.

The storing and reading processor 69, which is implemented by the instructions of the CPU 501 illustrated in FIG. 5 and the HDD 505 illustrated in FIG. 5, performs processing to store various types of data in the memory 6000 or read various types of data stored in the memory 6000.

<Functional Configuration of Mail Server>

The mail server 7 includes a transmitter and receiver 71, and a storing and reading processor 79. These units are functions that are implemented by or that are caused to function by operating any of the elements illustrated in FIG. 5 in cooperation with the instructions of the CPU 501 according to the destination management program expanded from the HD 504 to the RAM 503. The mail server 7 includes a memory 7000 implemented by the HD 504 illustrated in FIG. 5.

(Each Functional Unit of Mail Server)

Next, each functional unit of the mail server 7 is described in detail according to the embodiment. In the following description of the functional configuration of the mail server 7, relationships of the hardware elements in FIG. 5 with each functional unit of the mail server 7 in FIG. 11 will also be described.

The transmitter and receiver 71 of the mail server illustrated in FIG. 11, which is implemented by the instructions of the CPU 501 illustrated in FIG. 5 and by the network I/F 509 illustrated in FIG. 5, transmits or receives various types of data (or information) to or from another terminal, device, or system via the communication network 100.

The storing and reading processor 79, which is implemented by the instructions of the CPU 501 illustrated in FIG. 5 and the HDD 505 illustrated in FIG. 5, performs processing to store various types of data in the memory 7000 or read various types of data stored in the memory 7000.

<Functional Configuration of PC>

As illustrated in FIG. 11, the PC 10 includes a transmitter and receiver 11, an acceptance unit 12, a display control 14, and a storing and reading processor 19. These units are functions that are implemented by or that are caused to function by operating any of the elements illustrated in FIG. 5 in cooperation with the instructions of the CPU 501 according to the terminal control program expanded from the HD 504 to the RAM 503. The PC 10 further includes a memory 1000 implemented by the HD 504 illustrated in FIG. 5.

(Each Functional Unit of PC)

Next, a functional configuration of the PC 10 is described in detail. The transmitter/receiver 11 of the PC 10 illustrated in FIG. 11, which is implemented by the instructions of the CPU 501 illustrated in FIG. 5 and by the network I/F 509 illustrated in FIG. 5, transmits or receives various types of data (or information) to or from another terminal, device, or system via the communication network 100.

The acceptance unit 12, which is implemented by the instructions of the CPU 501, keyboard 511, and mouse 512, illustrated in FIG. 5, accepts various inputs from the user.

The display control 14, which is implemented by the instructions of the CPU 501 illustrated in FIG. 5, controls the display 508 to display such as a drawing image.

The storing and reading processor 19, which is implemented by the instructions of the CPU 501 and the HDD 505 illustrated in FIG. 5, performs processing to store various types of data in the memory 1000 or the recording medium 1100 or to read various types of data stored in the memory 1000 or the recording medium 1100. The recording medium 1100 is implemented by the recording medium 506 illustrated in FIG. 5.

Operations

In the following, operations of processing email transmission, performed by the communication system 1, are described according to embodiments of the present invention. The following describes an example case in which the user A and the user B are having a meeting in a certain meeting room using the electronic whiteboard 2x, as illustrated in FIG. 1. After an image is drawn by at least one of the user A and the user B, the electronic whiteboard 2x transmits the drawing image data to at least one of the PC 10a owned by the user A and the PC 10b owned by the user B.

Operation of First Embodiment

Figure 13:
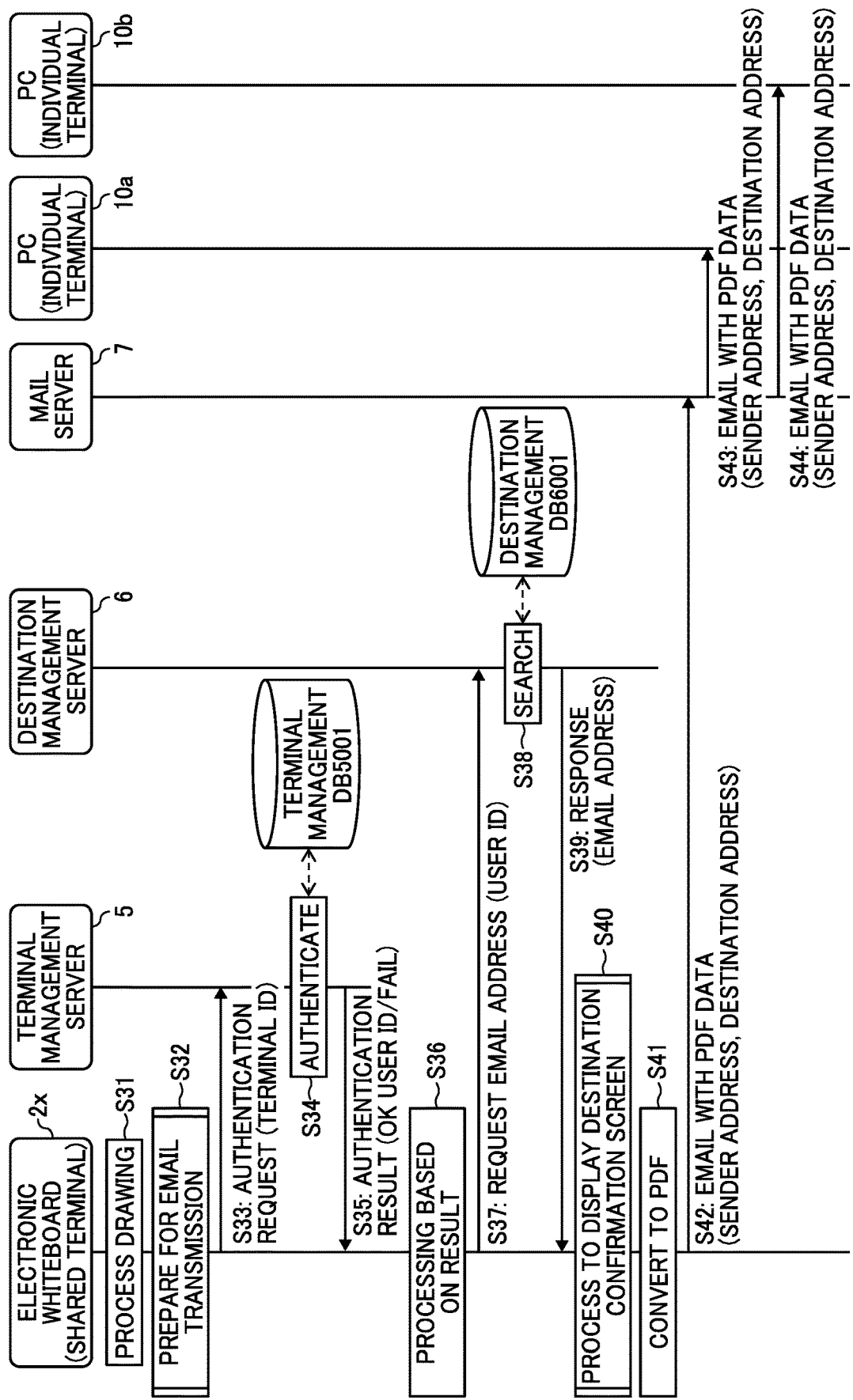
FIG. 13 is a sequence diagram illustrating operation of processing data communication, according to a first embodiment.
Figure 14:
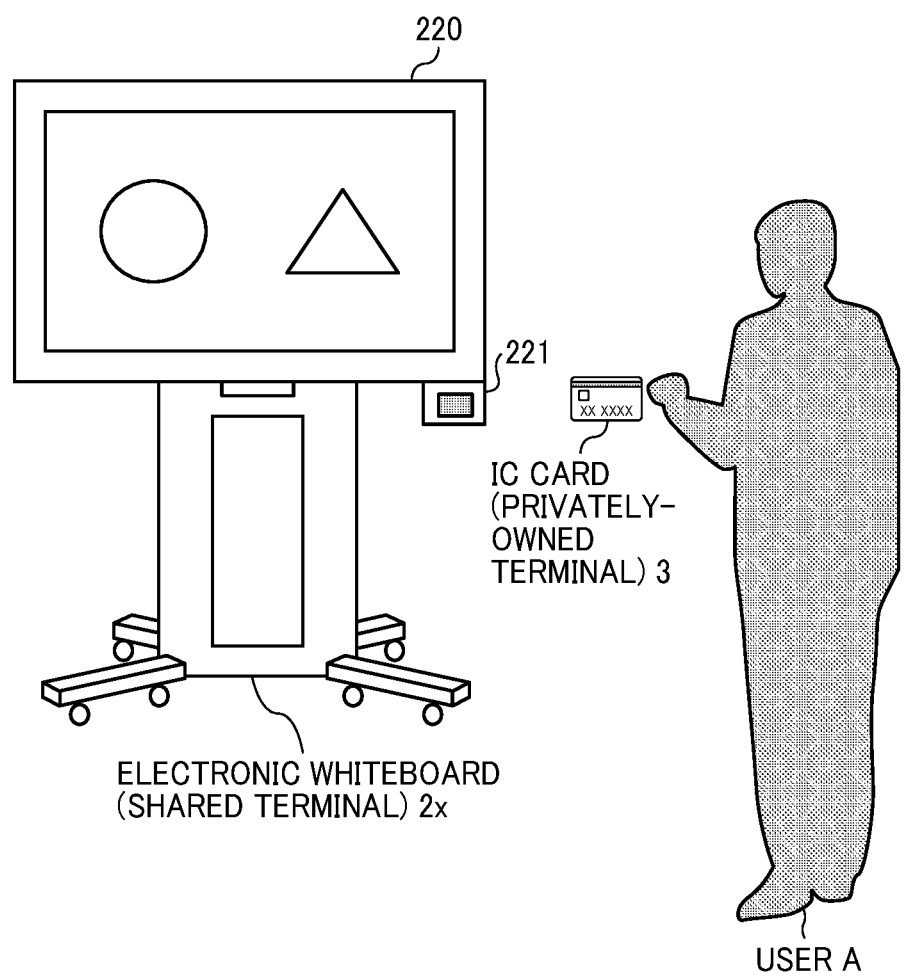
FIG. 14 is an illustration for explaining a use scenario of the electronic whiteboard, according to an embodiment.

Referring to FIGS. 13 to 17, operation of processing email transmission according to a first embodiment is described. FIG. 13 is a sequence diagram illustrating operation of transmitting or receiving data relating an image according to the first embodiment. FIG. 14 is an illustration for explaining a use scenario of the electronic whiteboard 2, according to the first embodiment. In this embodiment, it is assumed that the terminal management server 5 has been already installed in a company, which manages the user ID in association with the terminal ID of the privately-owned device such as the IC card 3 owned by the user. The electronic whiteboard 2x and the destination management server 6 are newly installed in the company, to construct the communication system 1 as illustrated in FIG. 1.

Referring to FIG. 13, the users A and B conduct the meeting, using a drawing image drawn on the electronic whiteboard 2x with the electronic pen 2500. The electronic whiteboard 2x processes the drawing image drawn by the user A or B to generate drawing image data (S31). The drawing image data is stored in a memory such as a local memory of the electronic whiteboard 2 every predetermined time, for example. As described above, the drawing image data may be transmitted via email. There are mainly two methods of transmitting drawing image data as an attachment to an email, from the electronic whiteboard 2x to at least one of the PC10a and PC 10b.

Assuming that the user A instructs email transmission, according to the first transmission method, the user A presses the "Menu" button 231 illustrated in FIG. 8A, to cause the display 220 to display the menu selection screen 232 as illustrated in FIG. 8B. The user A further presses the "Email" button 237 illustrated in FIG. 8B to display the address configuration field 274 illustrated in FIG. 10A, and selects an email address of the user A to be entered in the address configuration field 274 as illustrated in FIG. 10B. Alternatively, after instructing to display the destination configuration screen 270 as illustrated in FIG. 10A, the user A may select the "Manual input" tab 272 to manually enter the email address of the user A with such as the electronic pen 2500.

It is, however, desirable to quickly transmit the drawing image data to the PC 10a owned by the user A, as a time for meeting is usually limited. For instance, there may be another user who is waiting to use the electronic whiteboard 2x during or after the meeting. In view of this, the following second transmission method is preferably used, which allows quick data transmission.

Figure 15:
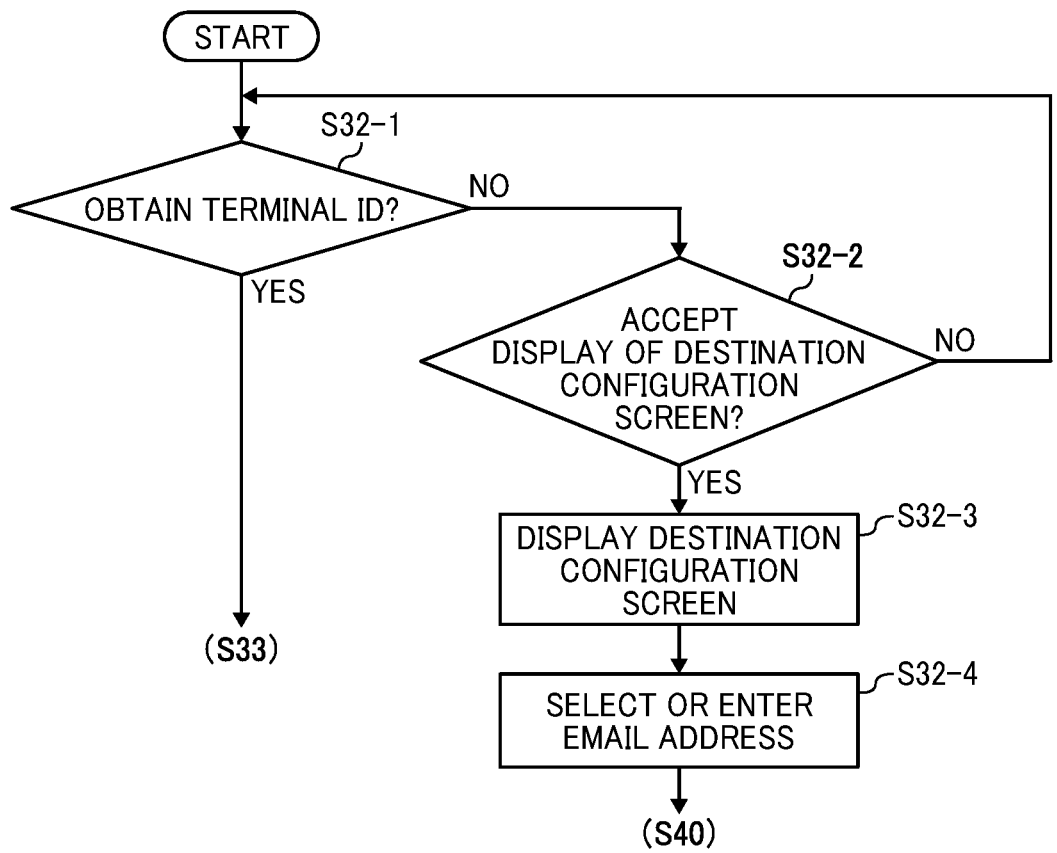
FIG. 15 is a flowchart illustrating operation of preparing for transmission of an email, according to an embodiment.

As illustrated in FIG. 14, for example, after drawing an image, the user A brings his or her IC card 3 into proximity of a near-distance communication device 221 of the electronic whiteboard 2x. The near-distance communication device 221 corresponds to the near-distance communication circuit 219 and the antenna 219a. In response to detection of the IC card 3 (or any object) at the near-distance communication device 221, the electronic whiteboard 2x starts processing to prepare for transmission of an email attached with drawing image data (S32). More specifically, the obtainer and provider 28 of the electronic whiteboard 2x obtains the terminal ID for identifying the IC card 3 (as the privately-owned terminal), from the obtainer and provider 38 of the IC card 3. Referring to FIG. 15, preparation processing of email transmission is described. FIG. 15 is a flowchart illustrating operation of preparation processing of transmission of an email, according to the embodiment.

As illustrated in FIG. 15, the determiner 25 of the electronic whiteboard 2x determines whether the terminal ID is obtained at the obtainer and provider 28 (S32-1). In this example, it is assumed that the determiner 25 determines that the terminal ID is obtained ("YES"), and the operation proceeds to S33 illustrated in FIG. 13.

In contrary, in the above-described first transmission method, the user A switches between a plurality of screens that are sequentially displayed to instruct transmission of drawing image data, without using the IC card 3. In the first transmission method, since the IC card 3 is not brought close to the near-distance communication device 221, the determiner 25 determines that the terminal ID is not obtained at S32-1 ("NO" at S32-1). In such case, the determiner 25 further determines whether the "Email" button 237 is pressed on the menu selection screen 232 illustrated in FIG. 8B, to instruct display of the destination configuration screen 270 illustrated in FIG. 10A (S32-2). At S32-2, when the determiner 25 determines that the instruction to display of the destination configuration screen 270 is not accepted ("NO" at S32-2), the operation returns to S32-1.

In contrary, at S32-2, when the determiner 25 determines that the instruction to display the destination configuration screen 270 is accepted ("YES" at S32-2), the display control 220 causes the display 220 to display the destination configuration screen 270 as illustrated in FIG. 10A (S32-3). Next, the acceptance unit 22 of the electronic whiteboard 2x accepts selection of the email address from the email addresses being displayed on the registered address book field 273 illustrated in FIG. 10A, or input of the email address after selection of the "Manual input" tab 272 (S32-4). The operation then proceeds to S40 of FIG. 13.

Assuming that the determiner 25 determines that the terminal ID is obtained ("YES" at S32-1), processing after S33 is described referring to FIG. 13.

The transmitter and receiver 21 of the electronic whiteboard 2x transmits an authentication request for authenticating the IC card 3 to the terminal management server 5 (S33). The authentication request includes the terminal ID of the IC card 3, obtained at the obtainer and provider 28. The terminal management server 5 receives the authentication request at the transmitter and receiver 51.

The authenticator 52 of the terminal management server 5 authenticates the IC card 3 using the terminal ID that is obtained (S34). More specifically, the storing and reading processor 59 searches the terminal management table (FIG. 12A) in the terminal management DB 5001 using the terminal ID received at S33 as a search key, to obtain the user ID associated with the terminal ID. When the user ID associated with the terminal ID is found, the authenticator 52 confirms the terminal ID of the IC card 3 to determine that the IC card 3 (terminal ID) is a legitimate IC card owned by the authorized user identified with the user ID that is found. When the user ID associated with the terminal ID is not found, the authenticator 52 determines that the IC card 3 (terminal ID) is not a legitimate IC card owned by the authorized user.

Next, the transmitter and receiver 51 of the terminal management server 5 transmits an authentication result to the electronic whiteboard 2x (S35). When the authenticator 52 determines that the IC card 3 is a legitimate IC card, the authentication result includes information indicating that the IC card 3 is a legitimate IC card and the user ID identifying the user who owns the IC card 3. When the authenticator 52 determines that the IC card 3 is not a legitimate IC card, the authentication result includes information indicating that the IC card 3 is not a legitimate IC card. The transmitter and receiver 21 of the electronic whiteboard 2x receives the authentication result. As described above, in this example, the terminal management server 5 having a function of returning an authentication result to an authentication requester, has been already installed in this company. Since it is often desirable for the company (user) not to change how the terminal management server 5 operates, the basic operation of returning the authentication result is not changed, even after installation of the electronic whiteboard 2x and the destination management server 6. Accordingly, in this embodiment, the terminal management server 5 returns the authentication result to the electronic whiteboard 2x.

Next, the electronic whiteboard 2x performs processing based on the authentication result (S36). In one example, when the authentication result includes information indicating that the IC card 3 is not a legitimate IC card, the display control 24 controls the display 220 to display a message indicating that email transmission is not allowed. When the authentication result includes information indicating that the IC card 3 is a legitimate IC card, the electronic whiteboard 2x continues to process email transmission of drawing image data. The following describes the case where the authentication result includes the information indicating that the IC card 3 is a legitimate IC card.

The transmitter and receiver 21 of the electronic whiteboard 2x transmits a request for email address of the user who owns the IC card 3 (user A, in this example) to the destination management server 6 (S37). The email address request includes the user ID that is received at S35. The destination management server 6 receives the email address request at the transmitter and receiver 61.

Next, the storing and reading processor 69 of the destination management server 6 searches the destination management table (FIG. 12B) in the destination management DB 6001, using the user ID received at S37 as a search key, to obtain the email address associated with the user ID (S38). The transmitter and receiver 61 transmits a response to the email address request to the electronic whiteboard 2x (S39). The response includes an email address read at S38, which is associated with the user ID of the user who owns the IC card 3. The electronic whiteboard 2x receives the response to the email address request at the transmitter and receiver 21.

Figure 16:
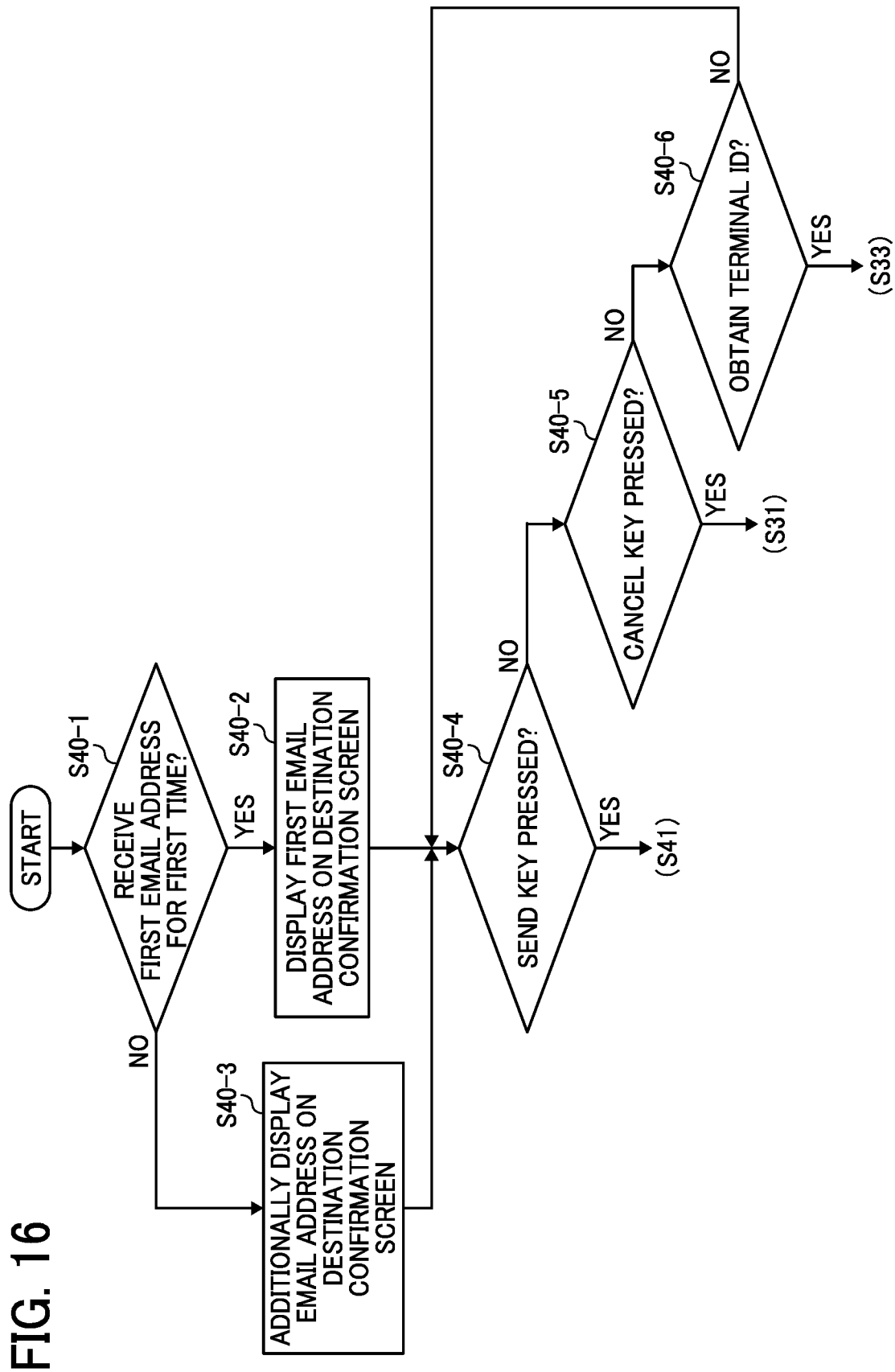
FIG. 16 is a flowchart illustrating operation of processing display of a destination confirmation screen, according to an embodiment.

The electronic whiteboard 2x controls the display 220 to display a destination confirmation screen (S40). Referring to FIGS. 16 and 17, operation of controlling display of the destination confirmation screen is described in detail. FIG. 16 is a flowchart illustrating operation of processing display of the destination confirmation screen, according to the embodiment. FIG. 17 is an illustration of an example destination confirmation screen displayed by the display at the electronic whiteboard.

Figure 17A:
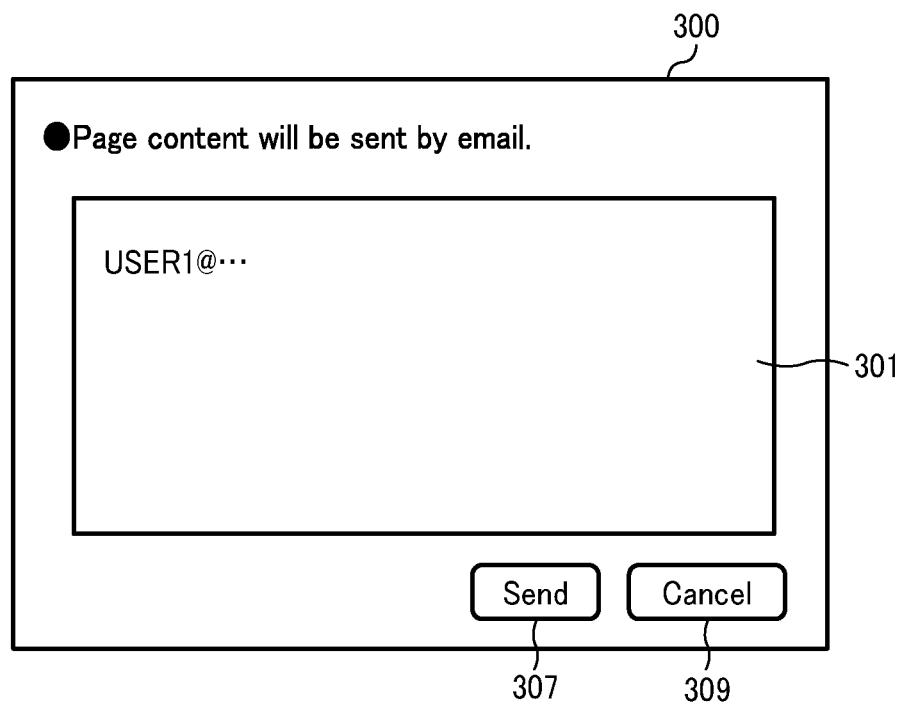
FIGS. 17A and 17B (FIG. 17) are an illustration of example screens displayed by the display at the electronic whiteboard.

As illustrated in FIG. 16, the determiner 25 determines whether the email address that has been received from the destination management server 6 at S39 is a first email address that has been firstly received after login to the electronic whiteboard 2x (S40-1). Since the electronic whiteboard 2x is a shared terminal shared by a plurality of users, login may be performed by any user using the electronic whiteboard 2x, for example, at the start of meeting. The determination result obtained at S40-1 is reset every time the user is logged off from the electronic whiteboard 2x. When the determiner 25 determines that the email address is the first email address that has been firstly received ("YES"

at S40-1), the display control 24 controls the display 220 to display a destination confirmation screen 300 including the first email address that has been received at S39, as illustrated in FIG. 17A (S40-2).

In the first transmission method, as the user A selects an email address from the registered address book field 273 on the destination configuration screen 270 illustrated in FIG. 10A, the display control 24 causes the display 220 to display, in the address configuration field 274 illustrated in FIG. 10B, the email address selected by the user A. In the second transmission method, the user A can input his or her email address, simply by bringing the IC card 3 close to the near-distance communication device 221 as illustrated in FIG. 14. For this reasons, any one of the destination confirmation screens 300 illustrated in FIGS. 17A and 17B does not have to display the registered address book field 273, but only the address configuration field 301. This results in a screen that is simpler in form, compared to the above-described screens illustrated in FIGS. 10A and 10B.

Next, the determiner 25 determines whether the "Send" button 307 in the destination confirmation screen 300 illustrated in FIG. 17A is selected (S40-4). When the determiner 25 determines that the "Send" button 307 is pressed ("YES" at S40-4), the operation proceeds to S41 of FIG. 13 to be described later.

Figure 17B:
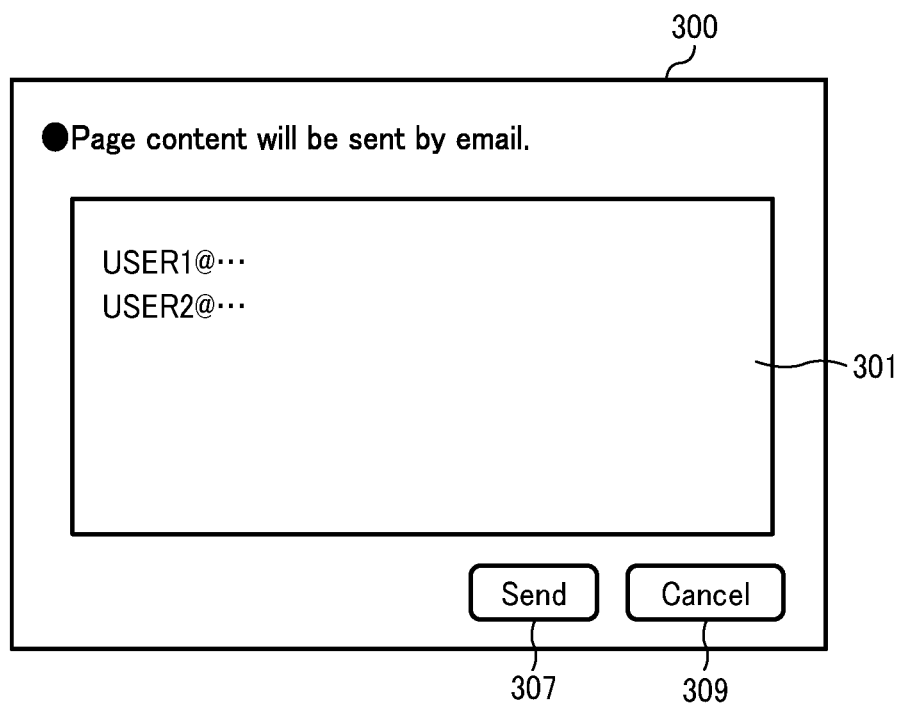

In contrary, at S40-1, when the determiner 25 determines that the email address received from the destination management server 6 at S39 is not the first email address that has been firstly received after login ("NO" at S40-1), the operation proceeds to S40-3. At 40-3, the display control 24 controls the display 220 to additionally display, with the first email address, a second email address that has been received after the first email address has been received, as illustrated in FIG. 17B. The operation then proceeds to S40-4. In a substantially similar manner as described above, the determiner 25 determines whether the "Send" button 307 in the destination confirmation screen 300 illustrated in FIG. 17B is selected (S40-4). The second email address is additionally displayed, for example, when the user B brings his or her smart phone 4 into proximity to the near-distance communication device 221, for example, after the destination confirmation screen 300 of FIG. 17A is displayed at the electronic whiteboard 2x in response to operation of the user A that brings his or her IC card 3 to the near-distance communication device 221.

At S40-4, when the determiner 25 determines that the "Send" button 307 in the destination configuration screen 300 is not pressed ("NO" at S40-4), the determiner 25 further determines whether the "Cancel" button 309 is pressed (S40-5). When the determiner 25 determines that the "Cancel" button 309 is pressed ("YES" at S40-5), the operation returns to S31 of FIG. 13. When the determiner 25 determines that the "Cancel" button 309 is not pressed ("NO" at S40-5), the operation proceeds to S40-6. The determiner 25 determines whether the terminal ID is obtained at the obtainer and provider 28 (S40-6). When it is determined that the terminal ID is not obtained ("NO" at S40-6), the operation returns to S40-4. When it is determined that the terminal ID is obtained ("YES" at S40-6), the operation proceeds to S33 to repeat operation of obtaining an email address of the user using the obtained terminal ID.

Assuming that the determiner 25 determines that the "Send" button 307 is pressed at S40-4, the processing after S41 is described referring to FIG. 13. The following describes an example case in which the user A brings his or her IC card 3 into proximity of the near-distance communication device 221, and then the user B brings his or her smart phone 4 into proximity of the near-distance communication device 221. Accordingly, the electronic whiteboard 2x obtains email addresses of the user A and the user B.

The second generator 26b of the electronic whiteboard 2x generates image data in PDF, from the drawing image data in bitmap that has been generated based on drawing by the user (S41). In this example, the drawing image data is captured when an instruction for email transmission is received, such as with pressing of the "Email" button in case of the first transmission method, or with detection of an object at the near-distance communication device 221 in case of the second transmission method. The transmitter and receiver 21 transmits an email attached with the image data in PDF that is generated at S41, to the mail server 7 (S42). The email includes a sender email address of the electronic whiteboard 2x, and a destination email address that is, an address of the PC 10a or the PC 10b that is received at S39. The transmitter and receiver 71 of the mail server 7 receives the email attached with the image data in PDF.

The transmitter and receiver 71 of the mail server 7 transmits the email, attached with the image data in PDF, to each one of the PC 10a and the PC 10b (S43, S44). The email includes a sender email address of the electronic whiteboard 2x, and a destination email address that is, an address of the PC 10a or the PC 10b that is received at S39. Each of the PC 10a and PC 10b receives the email attached with the image data in PDF, which is generated based on the drawing image drawn on the electronic whiteboard x.

As described above, according to the second transmission method, as long as the user such as the user A brings his or her IC card 3 into proximity of the near-distance communication device 221, the drawing image data is automatically transmitted to a terminal owned by the user such as the PC 10a, thus reducing the work load compared to the first transmission method. This greatly reduces a time required for sending data, such as drawing image data, to one or more users. Accordingly, the users using the meeting room are able to leave the meeting right after the meeting ends, without causing other user who reserves that meeting room to wait.

Operation of Second Embodiment

Figure 18:
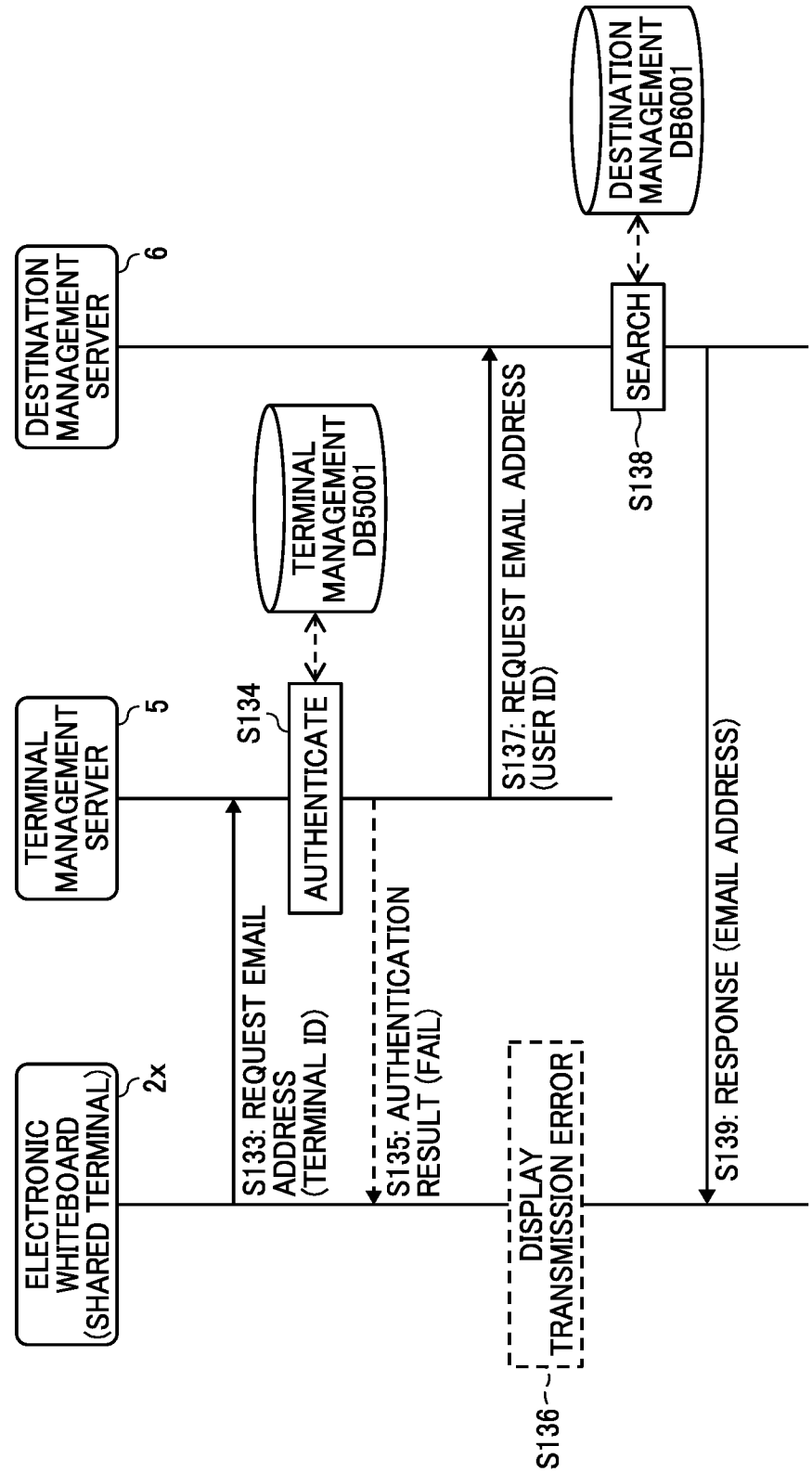
FIG. 18 is a sequence diagram illustrating operation of processing data communication, according to a second embodiment.

Referring to FIG. 18, operation of processing email transmission, performed by the communication system 1 of FIG. 1, is described according to a second embodiment. FIG. 18 is a sequence diagram illustrating a part of operation of transmitting or receiving data regarding an image according to the second embodiment. In this embodiment, it is assumed that, the electronic whiteboard 2x, the terminal management server 5, and the destination management server 6 are newly installed in a user environment. That is, at least a part of functions of the terminal management server 5 and the destination management server 6 may be integrated. In this embodiment, steps S33 to S39 of FIG. 13 according to the first embodiment are replaced by steps S133 to S138 of FIG. 18, such that the following describes operation of S133 to S138.

At S32-1 illustrated in FIG. 15, when the determiner 25 determines that the terminal ID is obtained ("YES" at S32-1), referring to FIG. 18, the transmitter and receiver 21 of the electronic whiteboard 2x transmits a request for email address to the terminal management server 5 (S133). The email address request includes the terminal ID of the IC card 3, obtained at the obtainer and provider 28. The terminal management server 5 receives the email address request at the transmitter and receiver 51.

The authenticator 52 of the terminal management server 5 authenticates the IC card 3 using the terminal ID that is obtained (S134). More specifically, the storing and reading processor 59 searches the terminal management table (FIG. 12A) in the terminal management DB 5001 using the terminal ID received at S133 as a search key, to obtain the user ID associated with the terminal ID. When the user ID associated with the terminal ID is found, the authenticator 52 confirms the terminal ID of the IC card 3 to determine that the IC card 3 (terminal ID) is a legitimate IC card owned by the authorized user identified with the user ID that is found. When the user ID associated with the terminal ID is not found, the authenticator 52 determines that the IC card 3 (terminal ID) is not a legitimate IC card owned by the authorized user.

When the authenticator 52 determines that the IC card 3 is not a legitimate IC card, the transmitter and receiver 51 transmits, to the electronic whiteboard 2x, the authentication result including information indicating that the IC card 3 is not a legitimate IC card (S135). The transmitter and receiver 21 of the electronic whiteboard 2x receives the authentication result. In this case, since the authentication result includes information indicating that the IC card 3 is not a legitimate IC card, the display control 24 of the electronic whiteboard 2x controls the display 220 to display a message indicating that email transmission is not allowed (S136).

At S134, when the authenticator 52 determines that the IC card 3 is a legitimate IC card with the authenticated terminal ID, the transmitter and receiver 51 transmits, to the destination management server 6, a request for email address at S137. The email address request includes the user ID associated with the terminal ID extracted from the IC card 3. The destination management server 6 receives the email address request at the transmitter and receiver 61. As described above, in this example, the electronic whiteboard 2x, terminal management server 5, and destination management server 6 are newly installed in the user environment. In such case, the functions of the terminal management server 5 can be freely changed. For this reasons, in this embodiment, the terminal management server 5 is programed so as to send a request for email address to the destination management server 6, in place of the electronic whiteboard 2x.

Next, the storing and reading processor 69 of the destination management server 6 searches the destination management table (FIG. 12B) in the destination management DB 6001, using the user ID received at S137 as a search key, to obtain the email address associated with the user ID (S138). The transmitter and receiver 61 transmits a response to the email address request to the electronic whiteboard 2x (S139). The address of the electronic whiteboard 2x may be obtained from the terminal management server 5, for example, when the request for email address is received. The response includes an email address read at S138, which is associated with the user ID of the user who owns the IC card 3. The electronic whiteboard 2x receives the response to the email address request at the transmitter and receiver 21. Accordingly, the electronic whiteboard 2x obtains the email address of the user A, who brings the IC card 3 into proximity of the near-distance communication device 221.

As described above, in this embodiment, the terminal management server 5 sends a request for email address to the destination management server 6 in place of the electronic whiteboard 2x (S137). This reduces processing to be performed at the electronic whiteboard 2x.

According to one or more embodiments of the present invention, user operation required for transmitting data such as the drawing image data via email is simplified, thus reducing the workload for the user.

In any one of the above-described embodiments, the electronic whiteboard 2x displays the destination confirmation screen illustrated in FIG. 17A or 17B, in response to detection of the IC card 3 or the smart phone 4 into proximity of the near-distance communication device 221. Alternatively, this process of displaying the destination confirmation screen (S40) may be omitted. In such case, in response to detection of the IC card 3 owned by the user A to the near-distance communication device 221, the electronic whiteboard 2x automatically transmits, to the mail sever 7, an email that is addressed to the PC 10a owned by the user A, and attached with the PDF image data. This further reduces time required for preparing email transmission of the drawing image data by the user.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

For example, in alternative to sending data of an image to be shared via email as an attachment file to the email, the electronic whiteboard 2x may send an email with a link to such image data via email. More specifically, the electronic whiteboard 2x stores the image data in any desired storage area on the network, and generates an email including a link to an address indicating the storage area where the image data is stored. The electronic whiteboard 2x further sends the email with the link, to the email address that is received from the destination management server 6. The address may be expressed by a URL, for example.

Further, the user may instruct the electronic whiteboard 2 to send any desired data regarding an image being displayed on the display 220 of the electronic whiteboard 2. Examples of such data regarding the image include, but not limited to, drawing image data that reflects drawings made by the user as described above, and non-drawing image data such as data of a presentation material as described above. For example, the data of the presentation material having additional drawing made by the user, or a link to such data, may be transmitted via email to allow access from the user.

In another example, the electronic whiteboard 2 may send image data of an electronic watermark, in addition to stroke data corresponding to the stroke data that reflects drawings made by the user. The electronic watermark data is any image, which is superimposed on a layer of the stroke data (that is, the drawing image data) for display to the user. The electronic watermark data may be stored in any desired memory, such as a memory of the electronic whiteboard 2. To make the stroke data visible to the user, the watermark data is displayed, for example, in partly transparent. For example, the image with the word "confidential" may be superimposed on the drawing image data, to warn the user that the drawing image data is confidential. When sending the drawing image data, which is displayed with the watermark data, the electronic whiteboard 2 may generate a PDF file of the drawing image data and the watermark data, and send an email addressed to the email address of the user, attached with a file of the generated PDF file. Alternatively, the electronic whiteboard 2 may send an email with a link to the file of the generated PDF file. With the watermark being displayed with the drawing image data (or any other image data), the user is able to know that such image data is confidential information.

In another example, the electronic whiteboard 2 may display the image data, such as the drawing image data, without the electronic watermark data. When sending the drawing image data, the electronic whiteboard 2 may generate a PDF file of the drawing image data and the watermark data, and send an email attached with a file of the generated PDF file or an email with a link to the generated PDF file. This improves visibility to the user during videoconferencing or any conferencing, while increasing a level of security when sending image data via email.

As described above, examples of the data regarding the image include data of an image being displayed at the electronic whiteboard such as the drawing image data, the drawing image data with the watermark data, any presentation material, etc. Other examples of the data regarding the image include data relating to the displayed image such as the watermark data.

Examples of drawings made by the user include, but not limited to, characters, marks, figures, etc., which may be drawn by the user either manually or using any graphics processing tool.

Further, the drawing image data may be captured at a time when a user instruction for sending the drawing image data is received. Alternatively, the drawing image data may be obtained from a local memory of the electronic whiteboard 2. For instance, the user may instruct the electronic whiteboard 2 to send drawing image data, which has been previously stored in a memory or read out from a removable recording medium. In such case, the user may firstly cause the electronic whiteboard 2 to display such image on the display 220 to be shared by a plurality of uses.

Further, the above-described example case assumes that only two users (user A and user B) instruct to send drawing image data via email. Alternatively, any number of users may instruct the electronic whiteboard 2 to send drawing image data via email. With detection of the terminal identification information, the electronic whiteboard 2 repeats operation of obtaining an email address.

The present invention can be implemented in any convenient form, for example using dedicated hardware, or a mixture of dedicated hardware and software. The present invention may be implemented as computer software implemented by one or more networked processing apparatuses. The processing apparatuses can compromise any suitably programmed apparatuses such as a general-purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any conventional recording medium, such as a floppy disk, hard disk, CD ROM, magnetic tape device or solid state memory device.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

In one example, the shared terminal includes: circuitry to control a display to display an image to a plurality of users, the plurality of users sharing a use of the shared terminal; and a network interface to communicate with a terminal management server and a destination management server through a network. The terminal management server stores in a first memory, for each one of the plurality of users, user identification information for identifying the user in association with terminal identification information for identifying a privately-owned terminal privately owned by the user. The destination management server stores in a second memory, for each one of the plurality of users, the user identification information of the user in association with an email address of the user. The circuitry obtains, from a first privately-owned terminal owned by a first user of the plurality of users, first terminal identification information for identifying the first privately-owned terminal. Under control of the circuitry, the network interface: transmits the first terminal identification information of the first privately-owned terminal to the terminal management server; receives first user identification information for identifying the first user from the terminal management server, the first user identification information being obtained by the terminal management server from the first memory using the first terminal identification information received from the shared terminal; transmits the first user identification information that is received to the destination management server; receives a first email address of the first user from the destination management server, the first email address being obtained by the destination management server from the second memory using the first user identification information received from the shared terminal; and transmits an email addressed to the first email address to allow the first user to obtain data relating the image being displayed to the plurality of users through the shared terminal.

In another example, the shared terminal includes a shared terminal including: circuitry to control a display to display an image to a plurality of users, the plurality of users sharing a use of the shared terminal; and a network interface to communicate with a terminal management server and a destination management server through a network. The terminal management server storing in a first memory, for each one of the plurality of users, user identification information for identifying the user in association with terminal identification information for identifying the privately-owned terminal owned by the user. The destination management server storing in a second memory, for each one of the plurality of users, the user identification information of the user in association with an email address of the user. The circuitry obtains, from a first privately-owned terminal owned by a first user of the plurality of users, first terminal identification information for identifying the first privately-owned terminal. Under control of the circuitry, the network interface: transmits the first terminal identification information of the first privately-owned terminal to the terminal management server; receives a first email address of the first user from the destination management server, the first email address being obtained by the destination management server from the memory using first user identification information for identifying the first user received from the terminal management server, the first user identification information being obtained by the terminal management server from the memory using the first terminal identification information received from the shared terminal; and transmits an email addressed to the first email address to allow the first user to obtain data relating the image being displayed to the plurality of users through the shared terminal.

In another example, in any one of the above-described shared terminal, the circuitry obtains the first terminal identification information while the image is being displayed on the display.

In one example, the circuitry controls the display to display a destination confirmation screen for confirming the first email address to which the email is to be transmitted.

In one example, the circuitry determines whether the first email address is an email address that has been received for the first time after login to the shared terminal. When the circuitry determines that the first email address is an email address that has been received for the first time, the destination confirmation screen includes only the first email address.

When the circuitry determines that the first email address is not an email address that has been received for the first time, the destination confirmation screen includes the first email address in addition to a currently displayed email address, the previously obtained email address being previously obtained as an email address of a second user of the plurality of users different from the first user.

In one example, in response to a user operation of drawing an image on a display surface of the display, the circuitry controls the display to display a drawing image that reflects the user operation of drawing, as the image being displayed.

In one example, the network interface transmits the first email address attached with the data relating the image, or the first email address including a link to a storage area where the data relating the image is stored.

In one example, the circuitry converts the drawing image in bitmap, to the image data in portable document format (PDF), as the image data to be transmitted as an attachment file to the email.

The invention claimed is:

1. A shared terminal, comprising:
    circuitry configured to cause a display to display an image to a plurality of users, the plurality of users simultaneously sharing use of the shared terminal; and
    a network interface configured to communicate with a destination management server through a network, the destination management server being different from the shared terminal and storing, in a memory, for each user of the plurality of users, user identification information of the user in association with an email address of the user, wherein
    the circuitry is further configured to:
        obtain, from a first terminal of a first user of the plurality of users, first terminal identification information identifying the first terminal;
        transmit first user identification information of the user of the first terminal to the destination management server;
        receive, from the destination management server, a first email address of the first user, the first email address being obtained from the memory of the destination management server using the first user identification information; and
        transmit an email addressed to the received first email address to allow the first user to obtain data relating to the image displayed to the plurality of users.

2. The shared terminal according to claim 1, wherein in a case that the circuitry obtains the first terminal identification information while the image is being displayed to the plurality of users, the network interface is further configured to transmit the first terminal identification information to a terminal management server.

3. The shared terminal according to claim 1, wherein the circuitry is further configured to cause the display to display a destination confirmation screen for confirming the first email address to which the email is to be transmitted.

4. The shared terminal according to claim 3, wherein
    the circuitry is further configured to determine whether the first email address is an email address that has been received for the first time after login to the shared terminal, and
    in a case that the circuitry determines that the first email address is an email address that has been received for the first time, the circuitry is further configured to cause the displayed destination confirmation screen to include only the first email address.

5. The shared terminal according to claim 3, wherein
    the circuitry is further configured to determine whether the first email address is an email address that has been received for the first time after login to the shared terminal, and
    in a case that the circuitry determines that the first email address is not an email address that has been received for the first time and is a previously obtained email address, the circuitry is further configured to cause the destination confirmation screen to include the first email address in addition to a currently displayed email address, the previously obtained email address being previously obtained as an email address of a second user, of the plurality of users, different from the first user.

6. The shared terminal according to claim 3, wherein in response to a user operation of drawing a drawn image on a display surface of the display, the circuitry is further configured to control the display to display a drawing image indicating the user operation of drawing, as the drawn image is being displayed.

7. The shared terminal according to claim 6, wherein the network interface is further configured to transmit the first email address, which is attached with the data relating to the drawn image, or transmit the first email address, which includes a link to a storage area where the data relating to the drawn image is stored.

8. The shared terminal according to claim 6, wherein
    the circuitry is further configured to convert the drawing image in bitmap to image data formatted in a portable document format (PDF), and
    the network interface is further configured to transmit the email attached with the image data formatted in the PDF.

9. The shared terminal according to claim 1, wherein the circuitry is further configured to obtain the first terminal identification information from the first terminal by near-distance communication technology.

10. The shared terminal according to claim 9, wherein the near-distance communication technology is one of Near Field Communication (NFC) and Bluetooth.

11. The shared terminal according to claim 1, wherein the shared terminal is an electronic whiteboard including the display.

12. The shared terminal according to claim 1, wherein the network interface is further configured to:
    communicate with a terminal management server that stores in a memory of the terminal management server, for each user of the plurality of users, user identification information identifying the user in association with terminal identification information identifying a privately-owned terminal privately owned by the user;
    transmit the first terminal identification information of the first terminal to the terminal management server; and
    receive, prior to transmitting the first user identification information, the first user identification information identifying the first user from the terminal management server, the first user identification information being obtained by the terminal management server from the memory using the first terminal identification information received from the shared terminal.

13. The shared terminal of claim 12, wherein the shared terminal is a component of a communication system comprising:
   the shared terminal of claim 12; and
   the terminal management server.

14. The communication system of claim 13, further comprising:
   the destination management server.

15. The communication system of claim 14, further comprising:
   the privately-owned terminal, including at least one of an IC card and a smart phone.

16. The shared terminal of claim 1, wherein the circuitry is further configured to obtain, from the first terminal of the first user of the plurality of users, first terminal identification information identifying the first terminal, in response to establishing communication between the shared terminal and the first terminal.

17. A method of controlling transmission of an image, performed by a shared terminal, the method comprising:
   displaying, on a display, an image to a plurality of users, the plurality of users simultaneously sharing use of the shared terminal;
   communicating with a destination management server, the destination management server storing, in a memory, for each user of the plurality of users, user identification information of the user in association with an email address of the user;
   obtaining, from a first terminal of a first user of the plurality of users, first terminal identification information identifying the first terminal;
   transmitting the received first user identification information to the destination management server;
   receiving a first email address of the first user from the destination management server, the first email address being obtained from the memory of the destination management server using the first user identification information; and
   transmitting an email addressed to the first email address to allow the first user to obtain data relating to the image displayed to the plurality of users.

18. The method according to claim 17, further comprising:
   communicating with a terminal management server that stores in a memory of the terminal management server, for each user of the plurality of users, user identification information identifying the user in association with terminal identification information identifying a privately-owned terminal privately owned by the user;
   transmitting the first terminal identification information of the first terminal to the terminal management server; and
   receiving, prior to transmitting the first user identification information, the first user identification information identifying the first user from the terminal management server, the first user identification information being obtained by the terminal management server from the memory using the first terminal identification information received from the shared terminal.

19. A non-transitory recording medium including a plurality of instructions which, when executed by one or more processors, cause the one or more processors to perform a method of controlling transmission of an image, performed by a shared terminal, the method comprising:
   displaying, on a display, an image to a plurality of users, the plurality of users simultaneously sharing use of the shared terminal;
   communicating with a destination management server, the destination management server storing, in a memory, for each user of the plurality of users, user identification information of the user in association with an email address of the user;
   obtaining, from a first terminal of a first user of the plurality of users, first terminal identification information identifying the first terminal;
   transmitting the received first user identification information to the destination management server;
   receiving a first email address of the first user from the destination management server, the first email address being obtained from the memory of the destination management server using the first user identification information; and
   transmitting an email addressed to the first email address to allow the first user to obtain data relating to the image displayed to the plurality of users.

20. The non-transitory recording medium of claim 19, wherein the method further comprises:
   communicating with a terminal management server that stores in a memory of the terminal management server, for each user of the plurality of users, user identification information identifying the user in association with terminal identification information identifying a privately-owned terminal privately owned by the user;
   transmitting the first terminal identification information of the first terminal to the terminal management server; and
   receiving, prior to transmitting the first user identification information, the first user identification information identifying the first user from the terminal management server, the first user identification information being obtained by the terminal management server from the memory using the first terminal identification information received from the shared terminal.

* * * * *